United States Patent
Kato et al.

(10) Patent No.: US 7,929,405 B2
(45) Date of Patent: Apr. 19, 2011

(54) RECORDABLE TYPE INFORMATION RECORDING MEDIUM, INFORMATION RECORDING APPARATUS, AND INFORMATION RECORDING METHOD

(75) Inventors: Masahiro Kato, Tokorozawa (JP);
Tsuyoshi Hasebe, Tokorozawa (JP);
Masayoshi Yoshida, Tokorozawa (JP);
Toshio Suzuki, Tokorozawa (JP); Kazuo Kuroda, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 327 days.

(21) Appl. No.: 12/301,683

(22) PCT Filed: May 30, 2006

(86) PCT No.: PCT/JP2006/310819
§ 371 (c)(1),
(2), (4) Date: Nov. 20, 2008

(87) PCT Pub. No.: WO2007/138686
PCT Pub. Date: Dec. 6, 2007

(65) Prior Publication Data
US 2009/0196136 A1    Aug. 6, 2009

(51) Int. Cl.
*G11B 7/24* (2006.01)

(52) U.S. Cl. .......... 369/275.4; 369/275.3; 369/283

(58) Field of Classification Search ........... 369/275.4, 369/275.3, 47.15, 53.21, 283, 275.1, 30.1, 369/44.26, 53.35, 277
See application file for complete search history.

(56) References Cited

U.S. PATENT DOCUMENTS

| | | | |
|---|---|---|---|
| 6,181,672 B1 | 1/2001 | Muramatsu et al. | |
| 6,594,224 B2 * | 7/2003 | Muramatsu et al. | 369/275.4 |
| 6,741,548 B2 * | 5/2004 | Muramatsu et al. | 369/275.4 |
| 6,992,959 B1 | 1/2006 | Tosaki et al. | |
| 7,020,067 B2 * | 3/2006 | Ueki | 369/275.3 |
| 2001/0002899 A1 | 6/2001 | Muramatsu et al. | |
| 2001/0043515 A1 | 11/2001 | Ueki | |
| 2002/0026587 A1 | 2/2002 | Talstra | |
| 2003/0053406 A1 | 3/2003 | Muramatsu et al. | |
| 2005/0207287 A1 | 9/2005 | Ueki | |
| 2005/0207288 A1 | 9/2005 | Ueki | |

FOREIGN PATENT DOCUMENTS

| | | |
|---|---|---|
| JP | 2000-132868 | 5/2000 |
| JP | 2000-149415 | 5/2000 |
| JP | 2002-92890 | 3/2002 |
| JP | 2003-532970 | 11/2003 |

* cited by examiner

*Primary Examiner* — Ali Neyzari
(74) *Attorney, Agent, or Firm* — Young & Thompson

(57) ABSTRACT

In a recording disc, a straight groove (31) and a position determining pit (33) are formed in an inner circumference area (21), and a straight groove (34) and an over-run preventing pit (36) are formed in an outer circumference area (22), and only a straight groove (37) is formed over the entire middle area (23).

16 Claims, 20 Drawing Sheets

[FIG. 1]
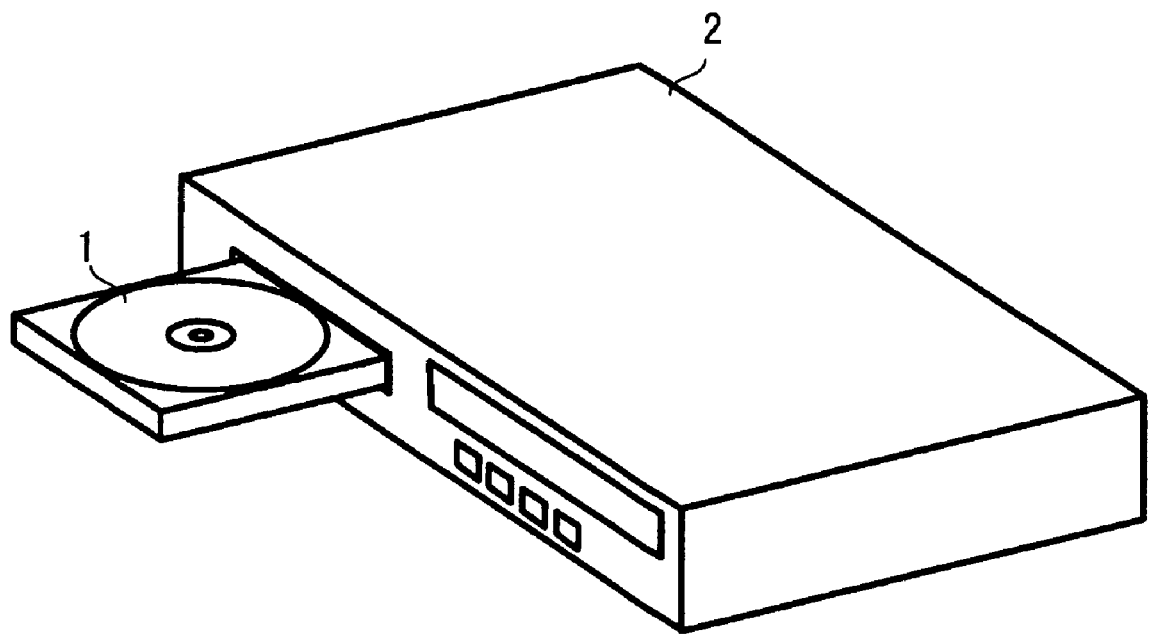

[FIG. 2]
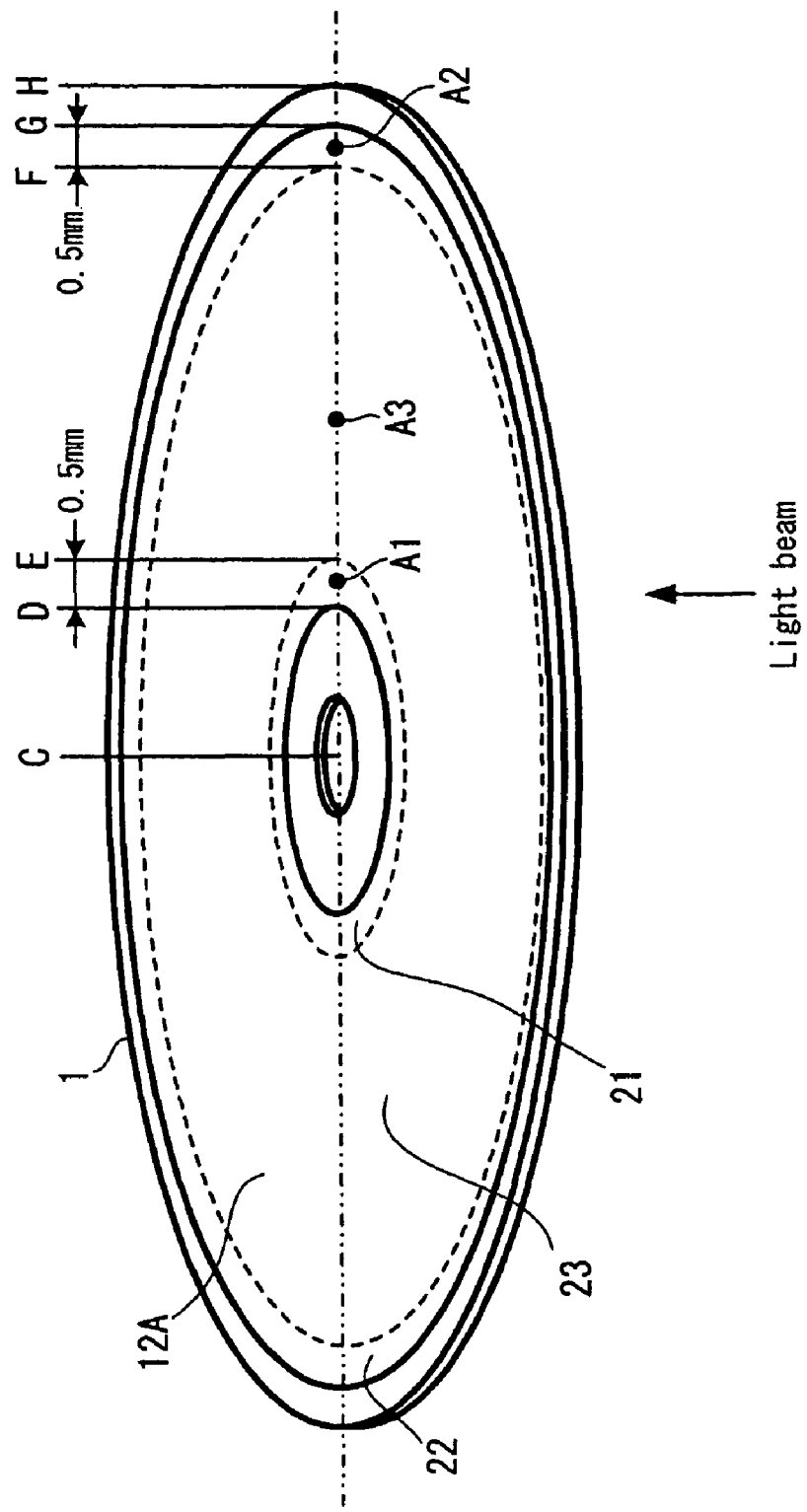

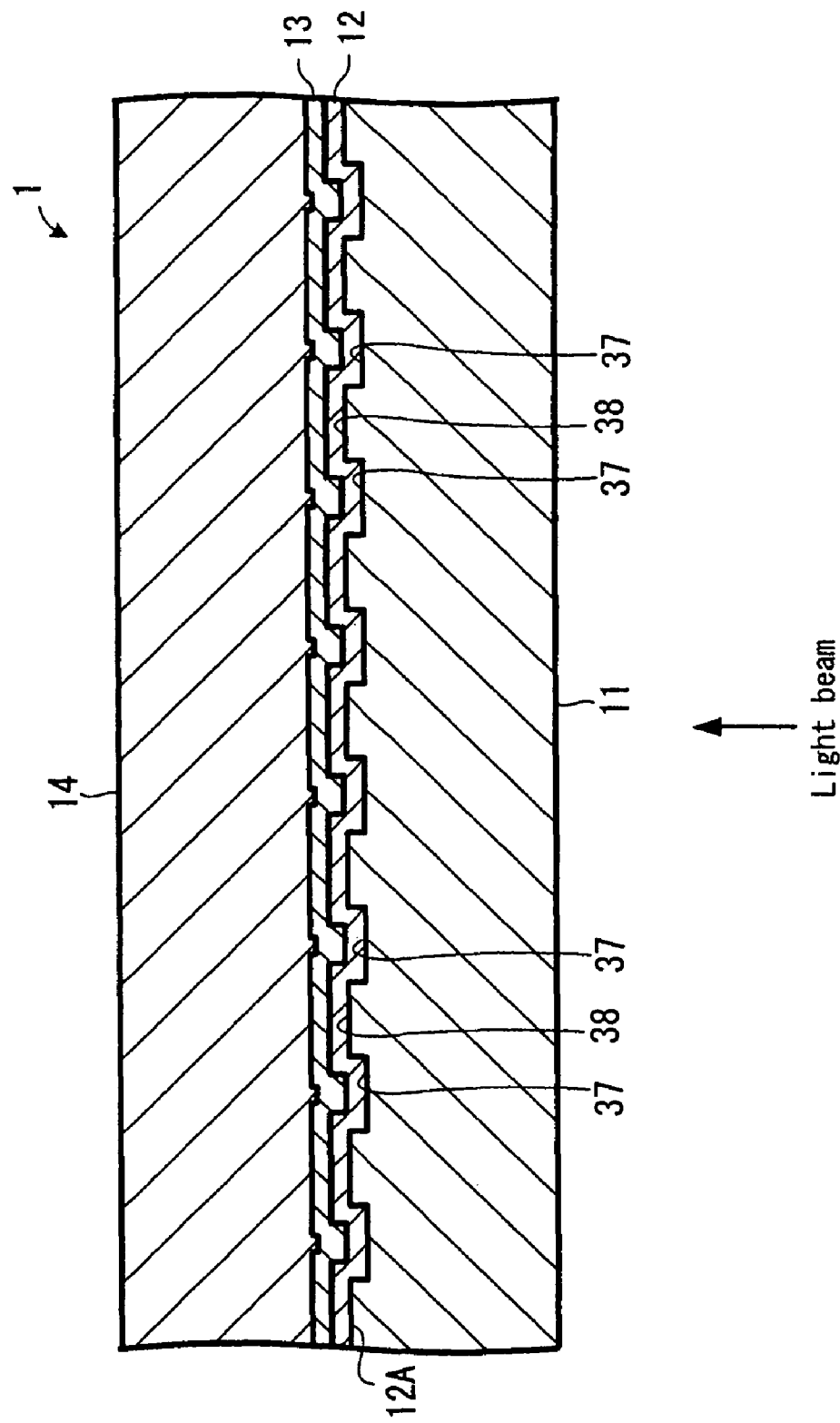
[FIG. 3]

[FIG. 4]
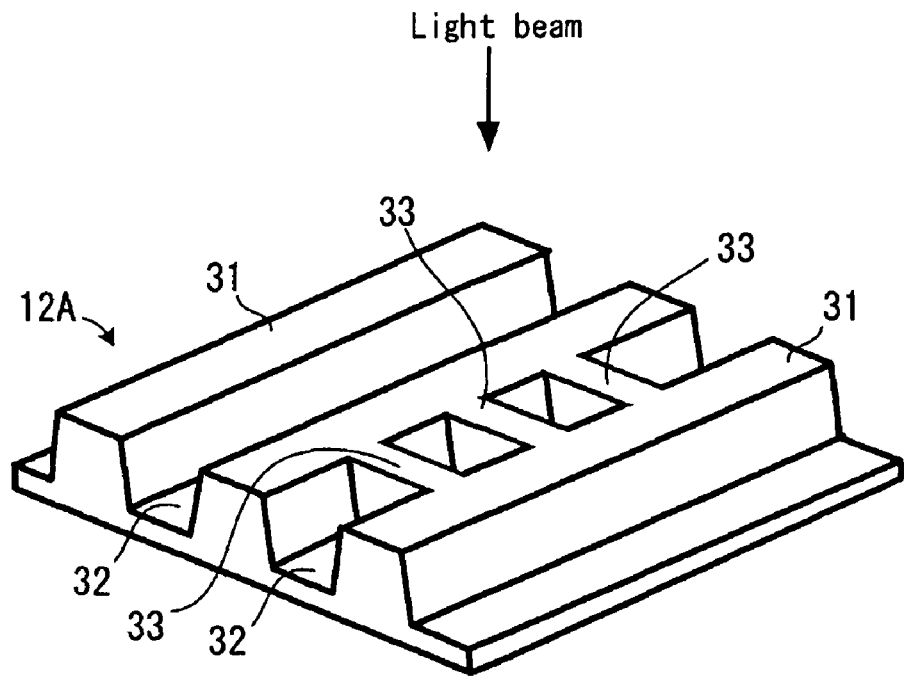
[FIG. 5]
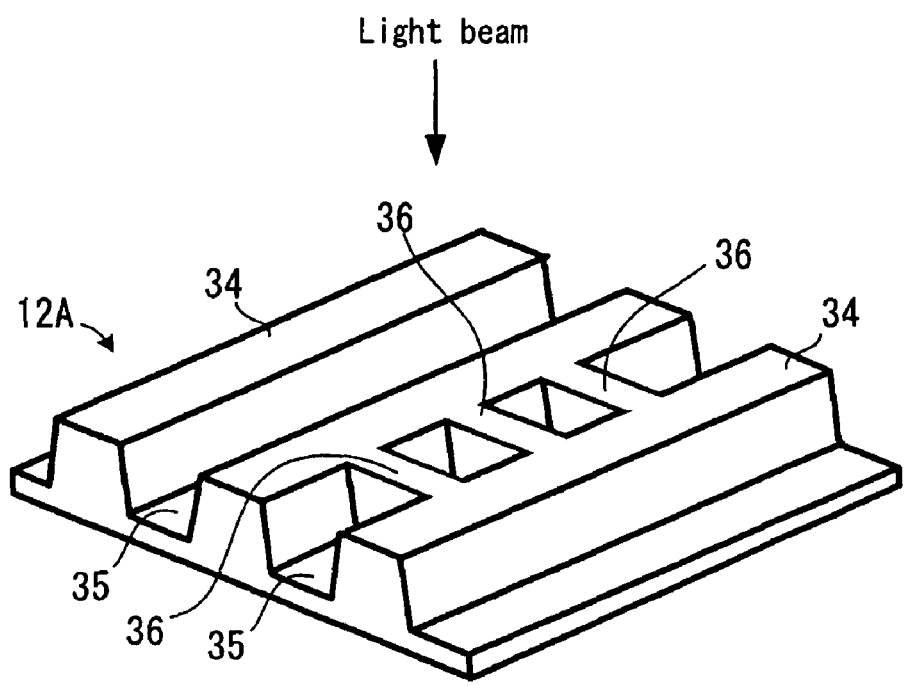

[FIG. 6]
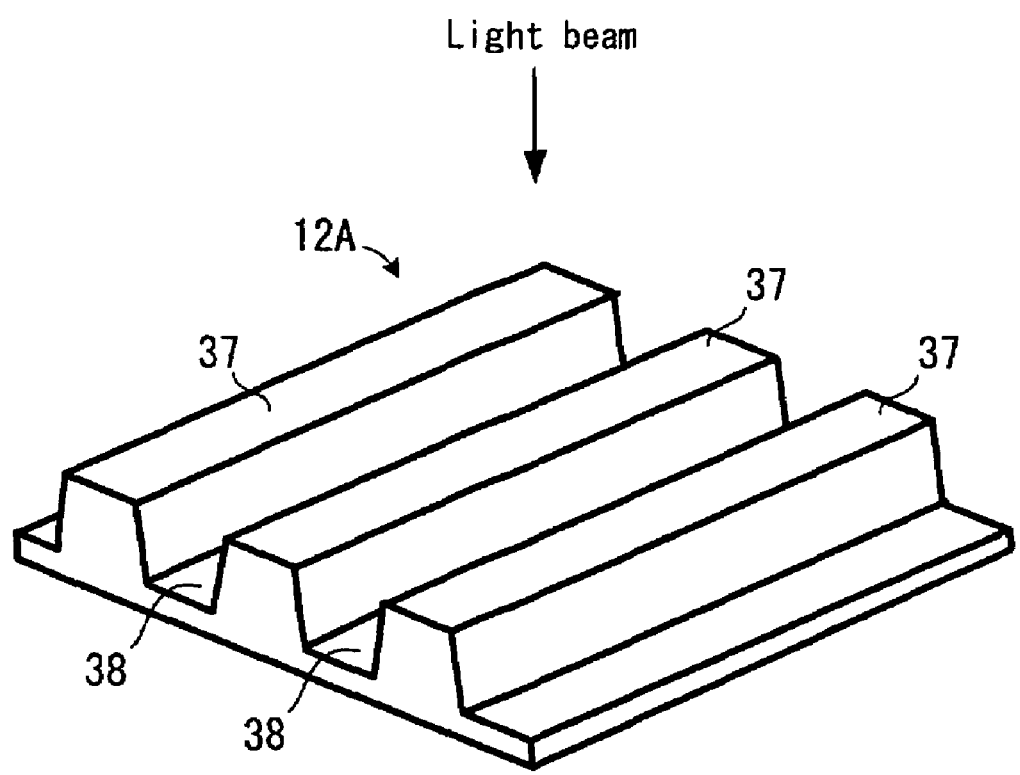

[FIG. 7]
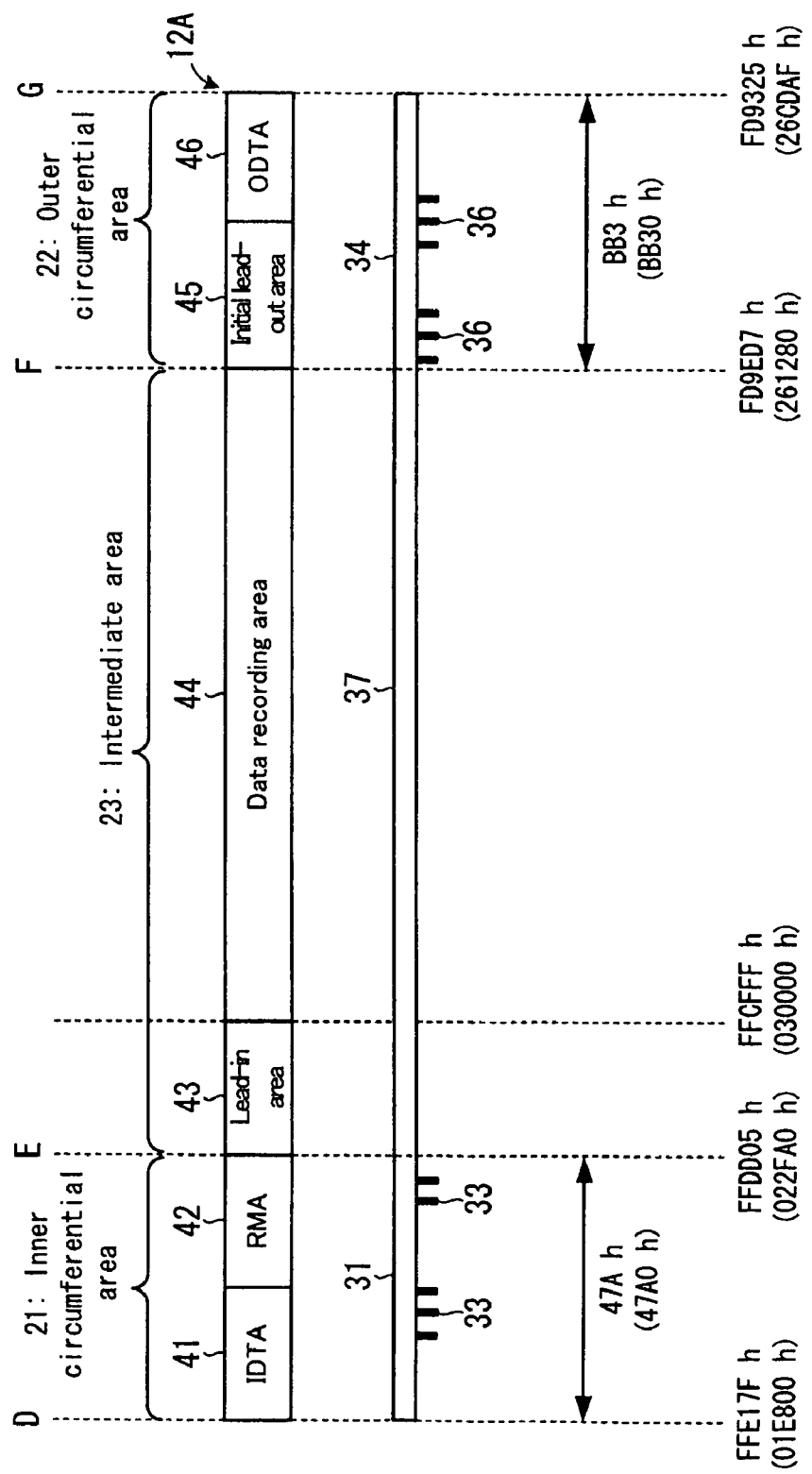

[FIG. 8]
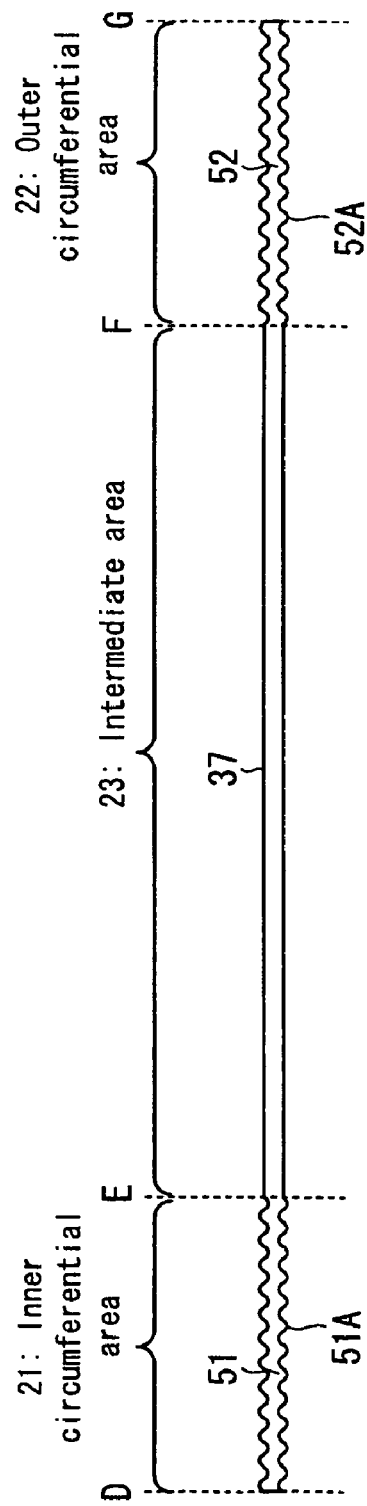

[FIG. 9]
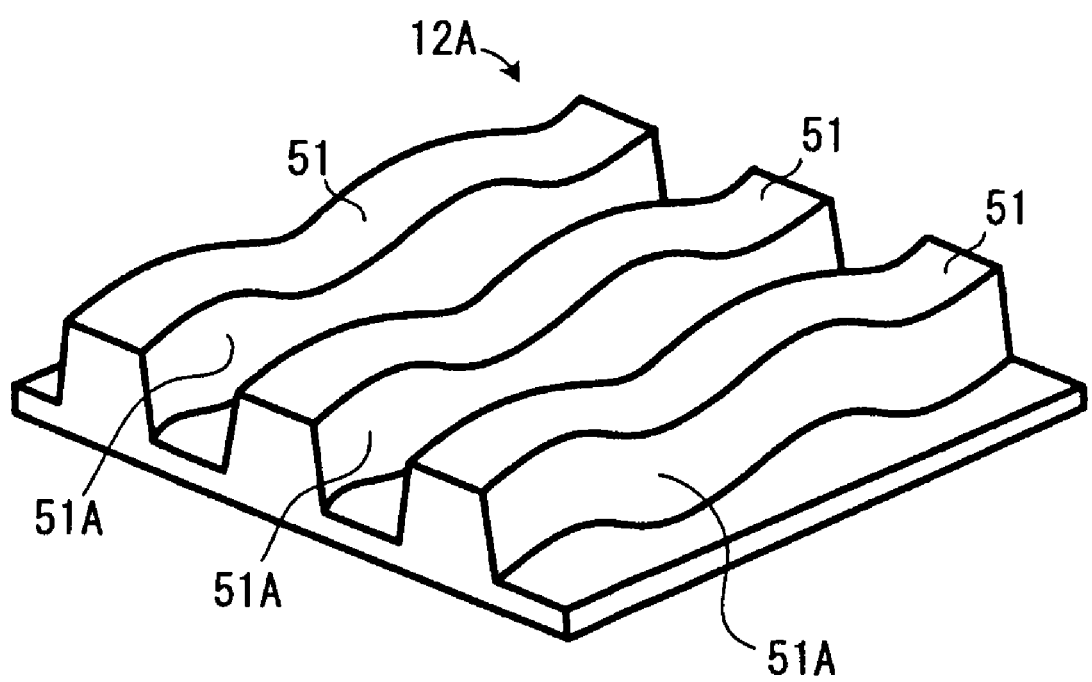

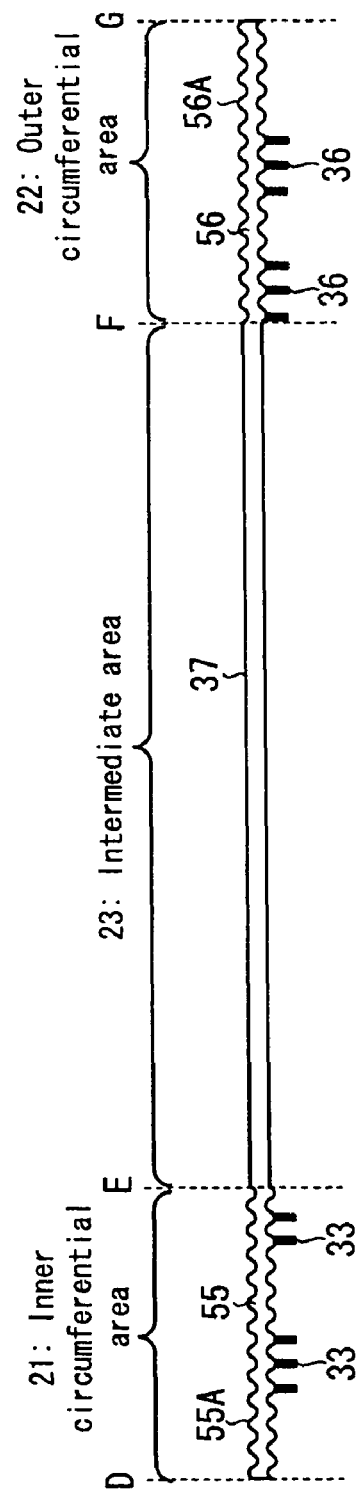
[FIG. 10]

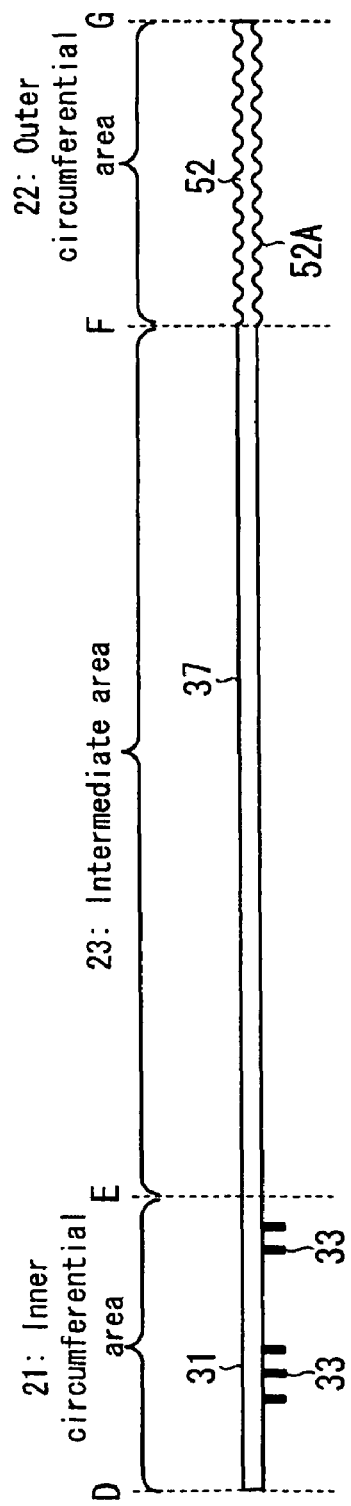
[FIG. 11]

[FIG. 12]
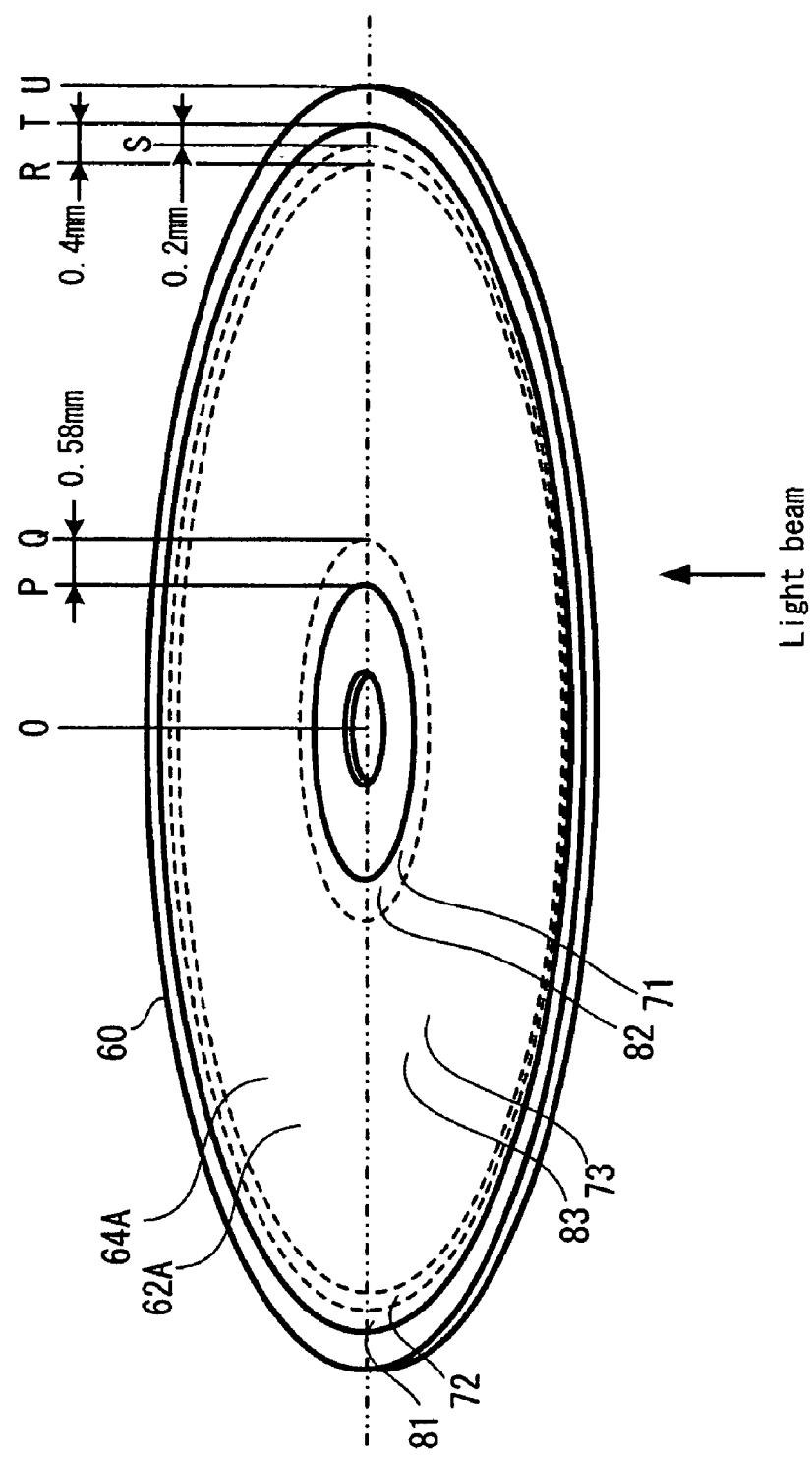

[FIG. 13]
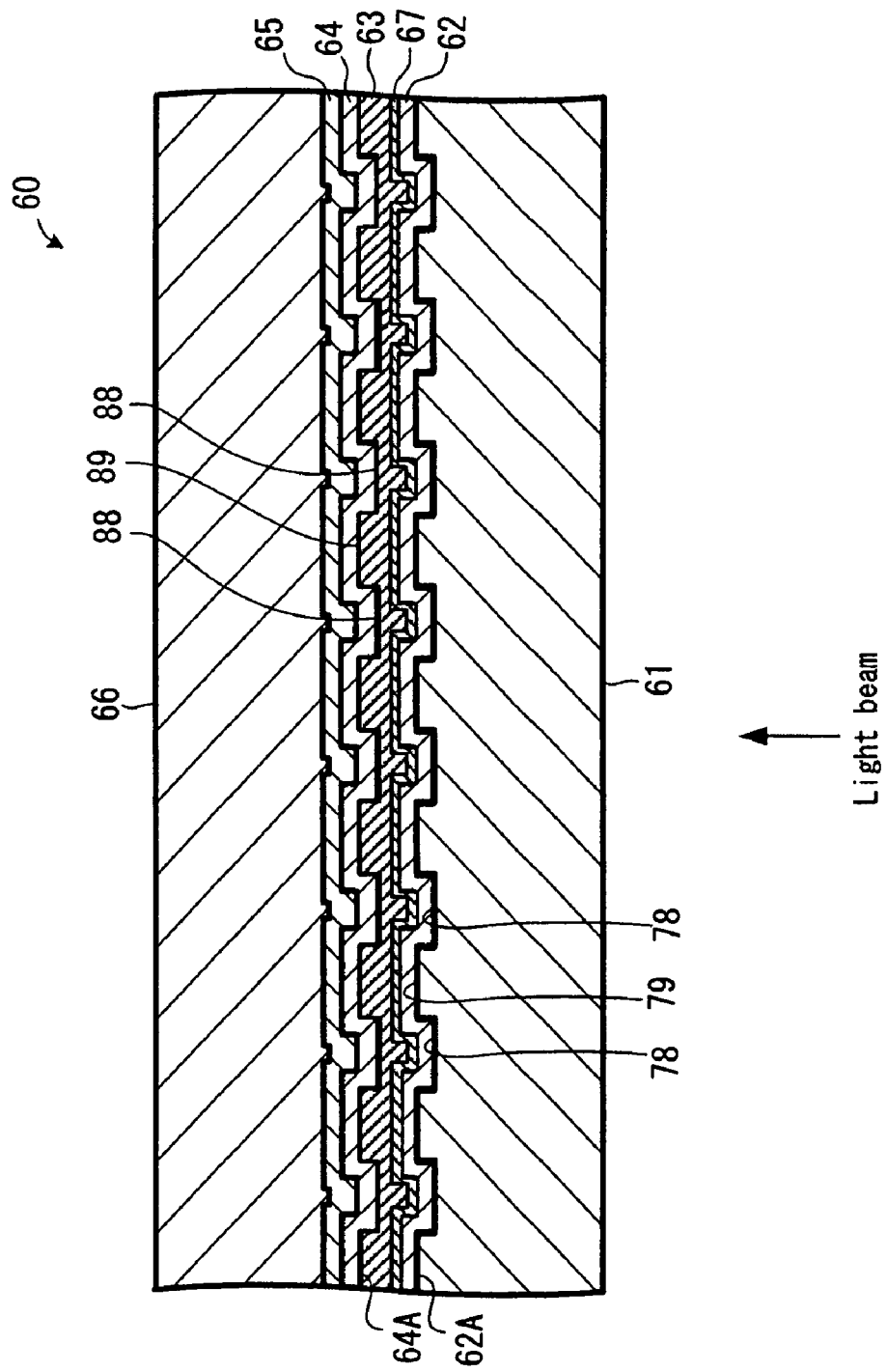

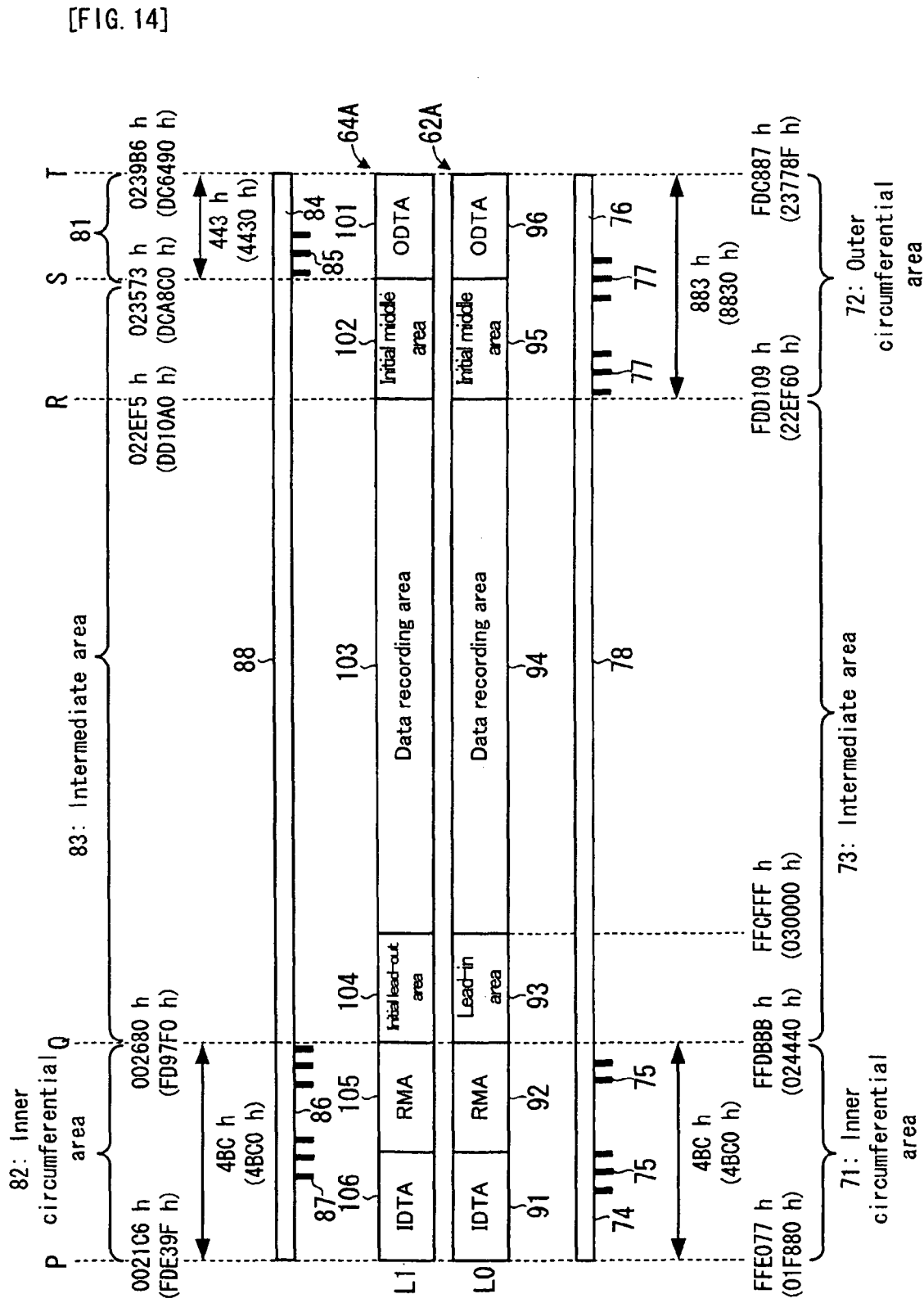
[FIG. 14]

[FIG. 15]
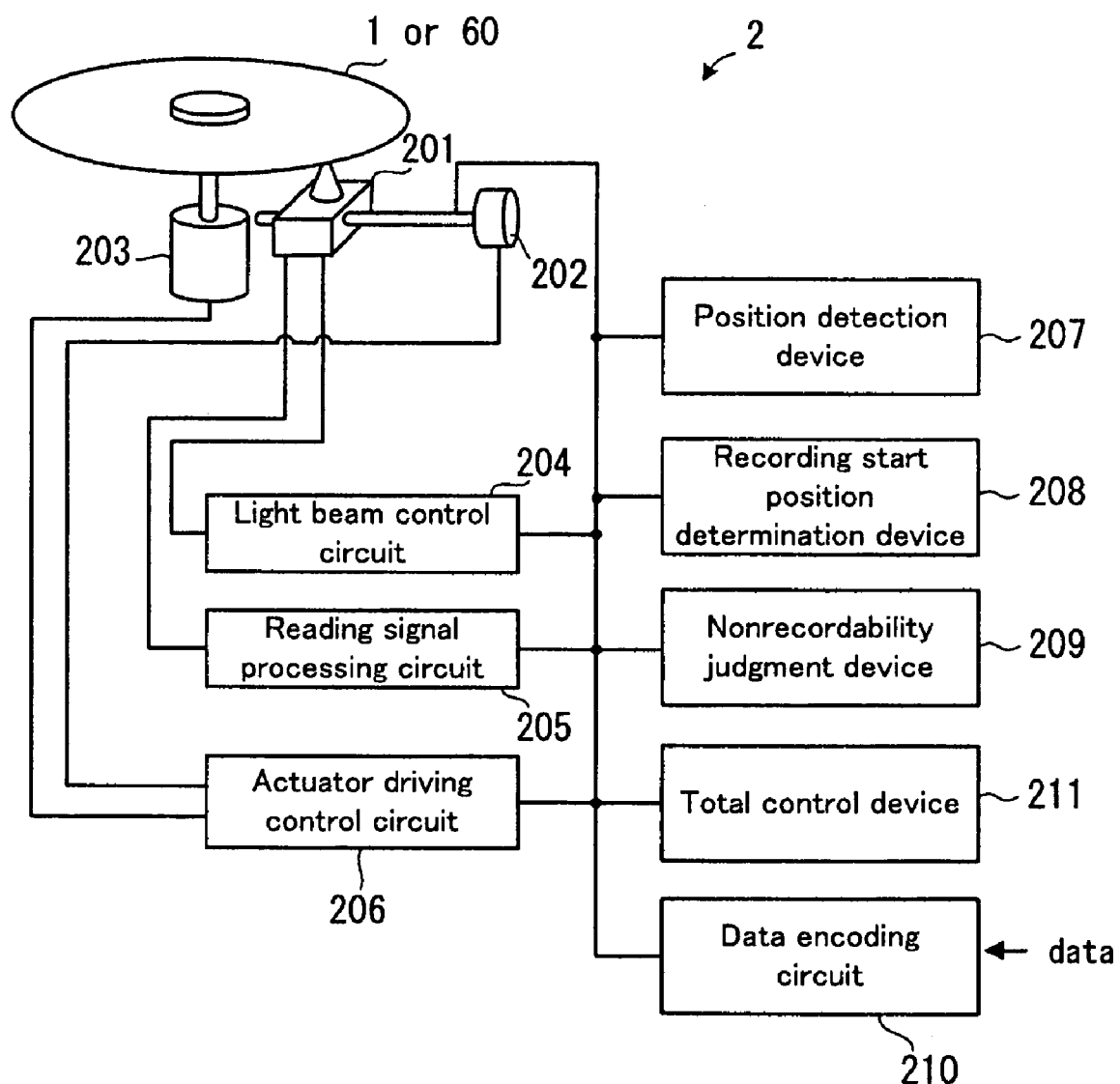

[FIG. 16]
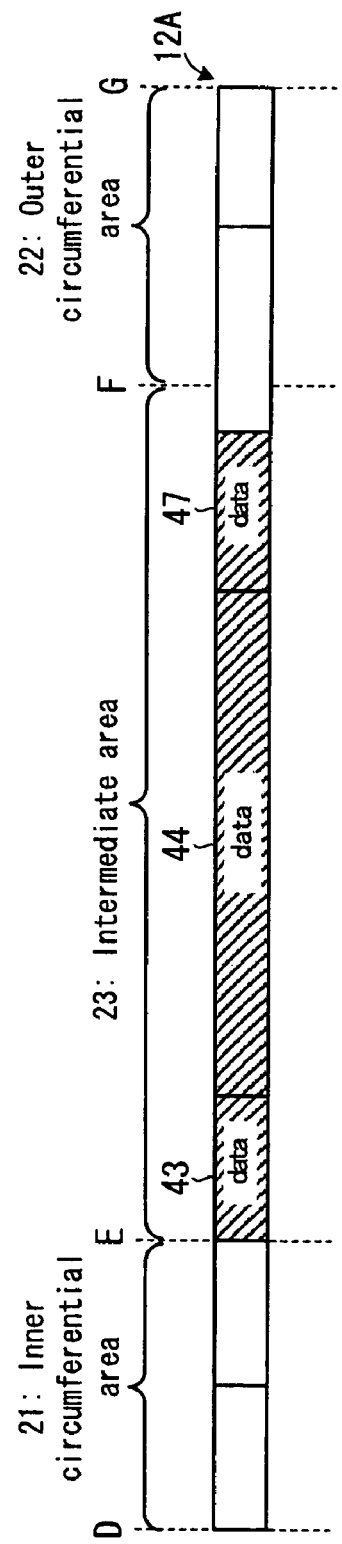

[FIG. 17]
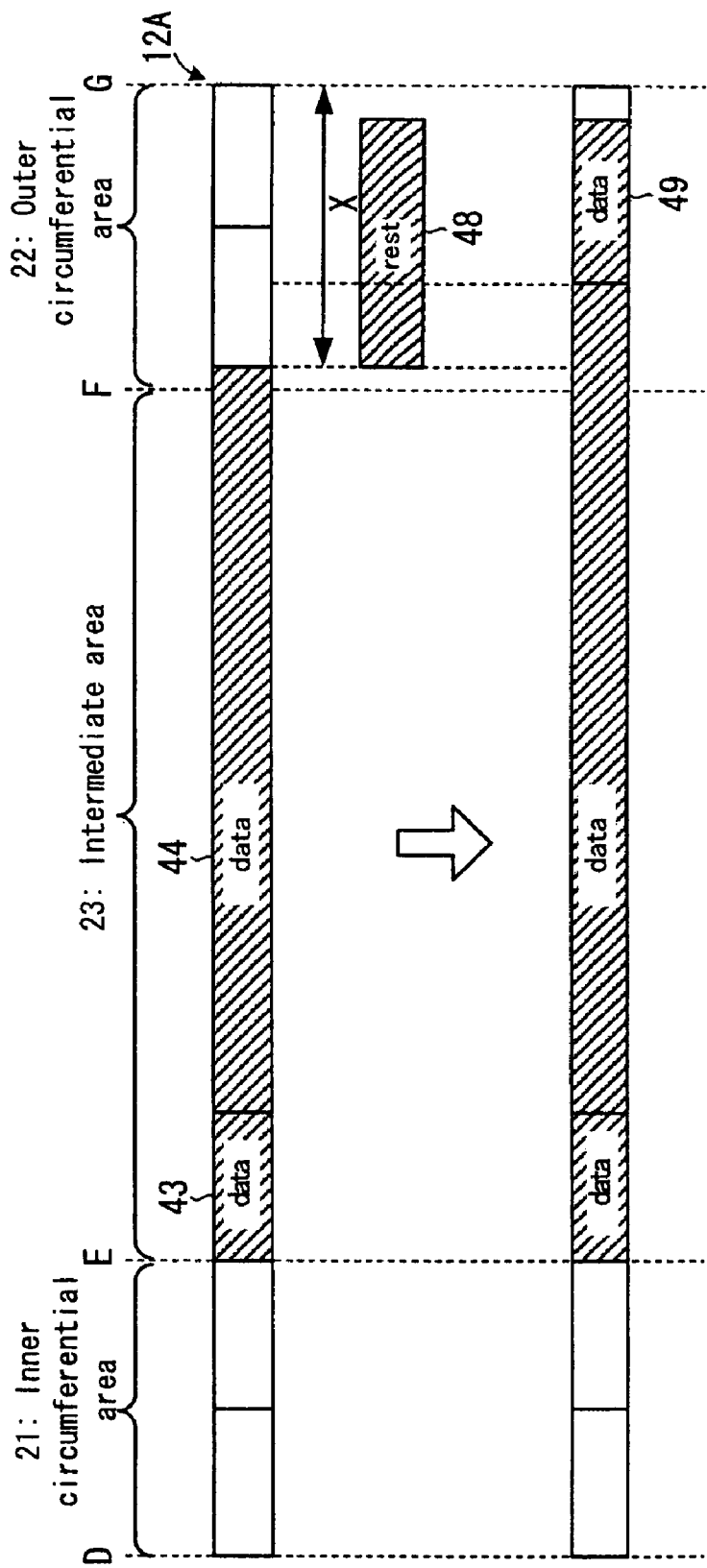

[FIG. 18]
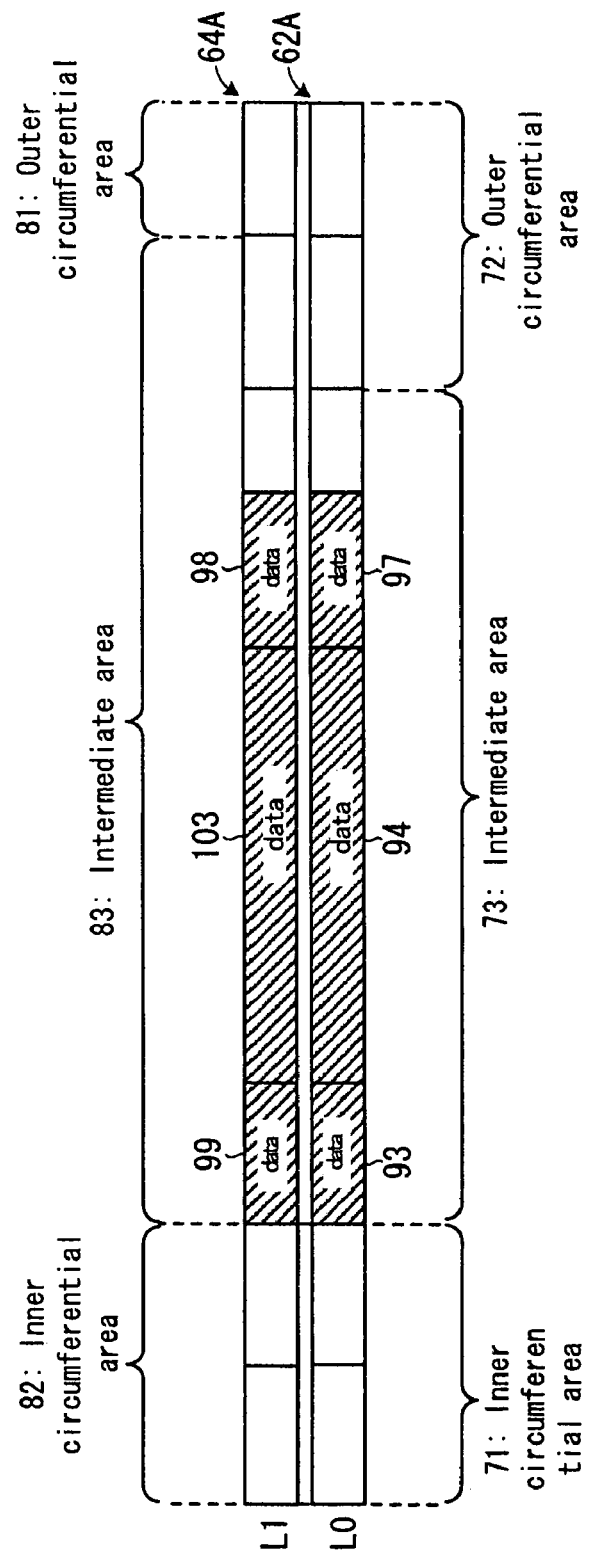

[FIG. 19]
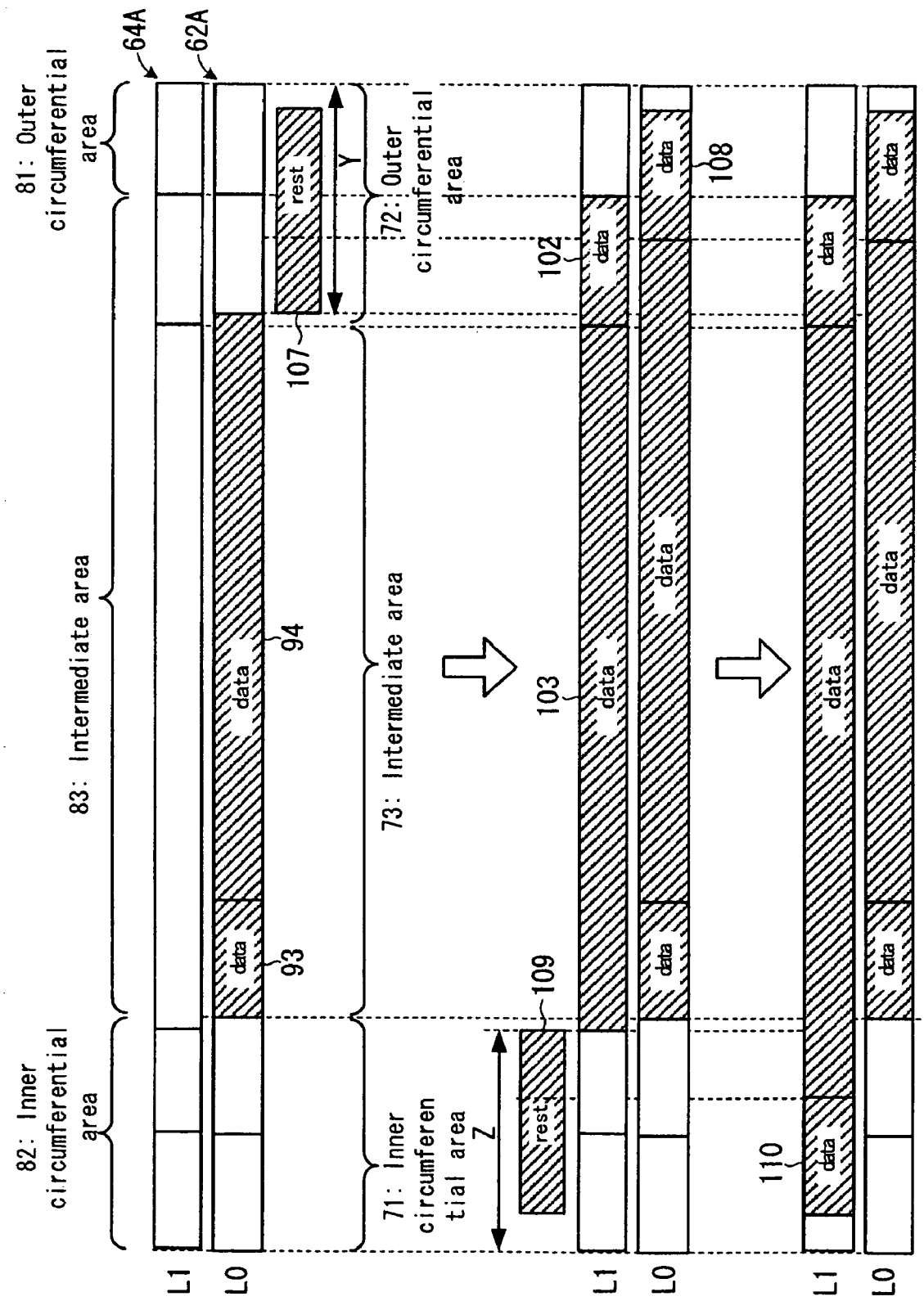

[FIG. 20]
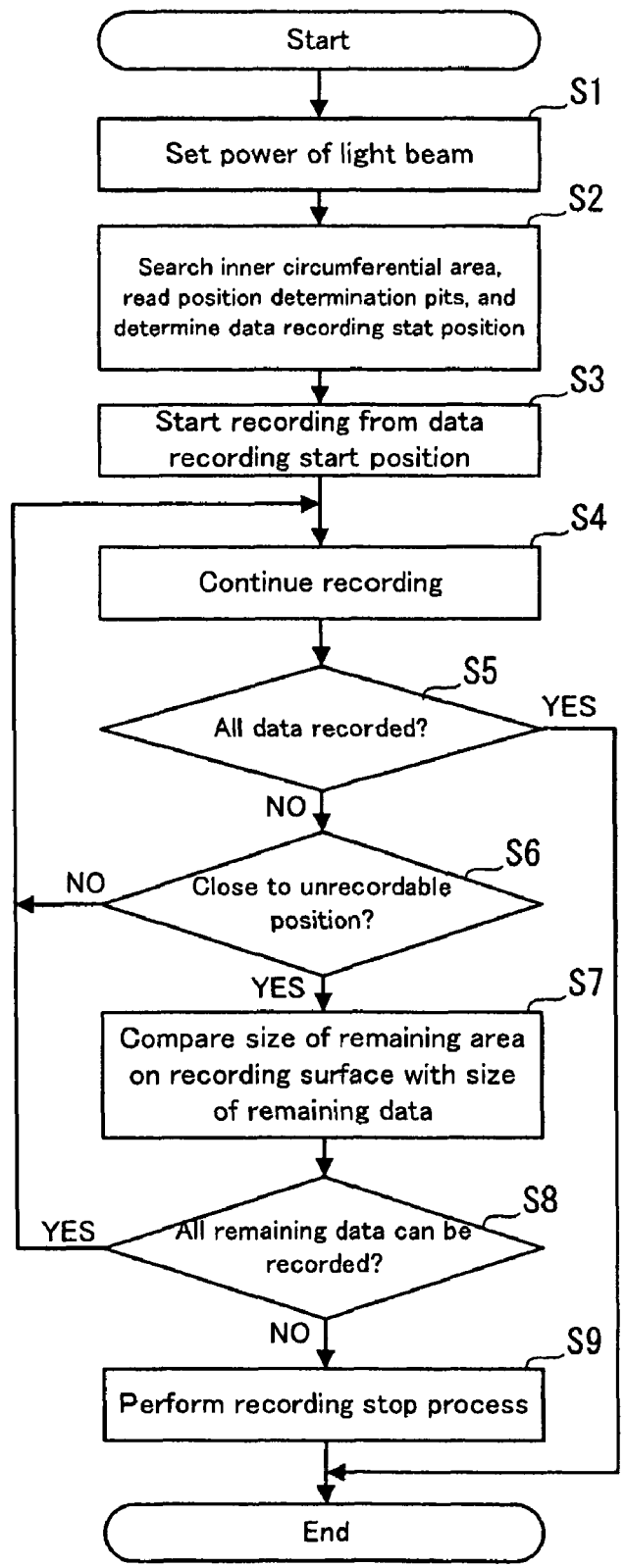

[FIG. 21]
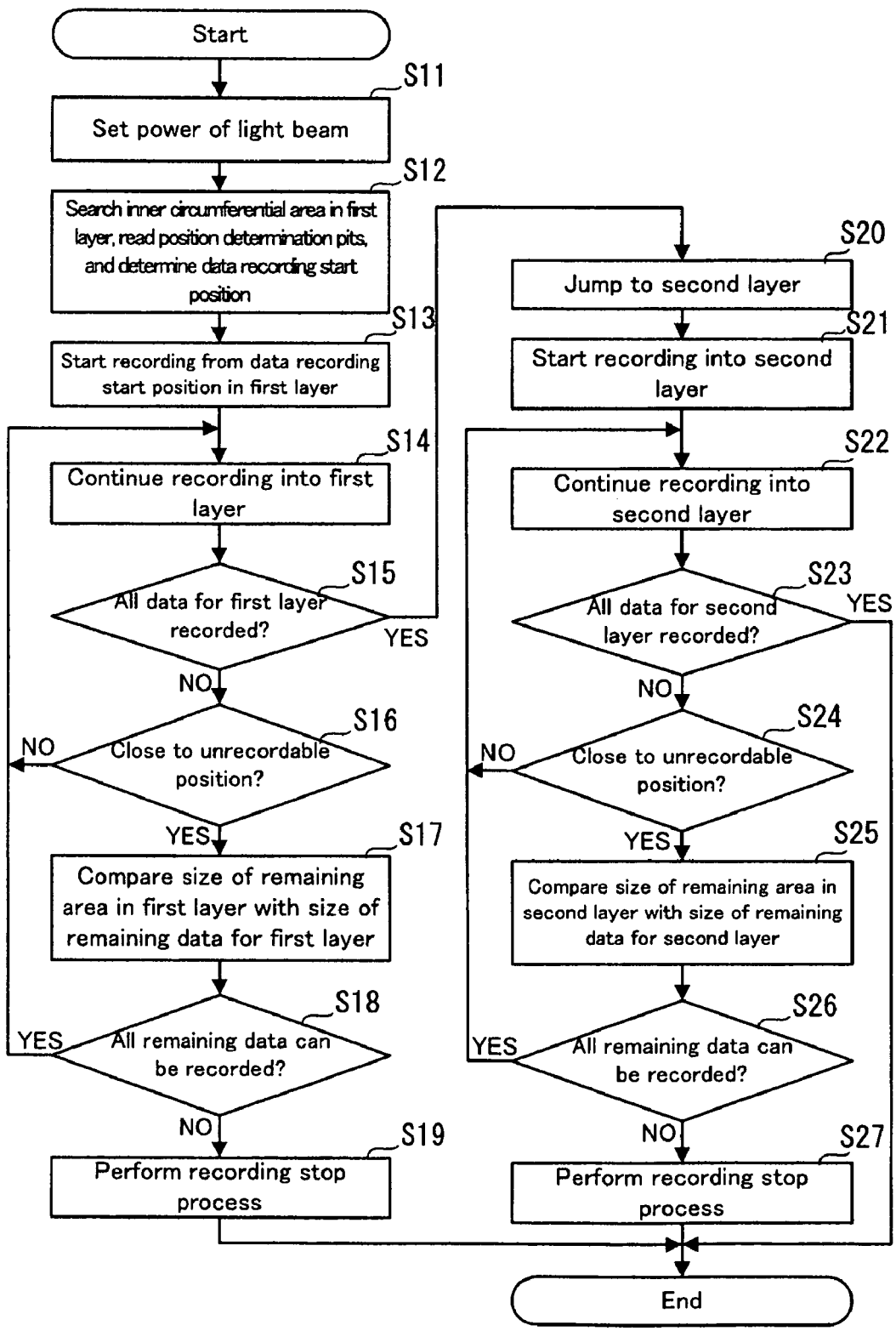

RECORDABLE TYPE INFORMATION RECORDING MEDIUM, INFORMATION RECORDING APPARATUS, AND INFORMATION RECORDING METHOD

TECHNICAL FIELD

The present invention relates to an information recording medium, an information recording apparatus, and an information recording method, for recording encrypted data for the purpose of copyright protection.

BACKGROUND ART

There is a CSS (Content Scrambling System) as an encryption method adopted in a read-only type DVD. Moreover, there is a CPRM (Content Protection for Recordable Media) as an encryption method adopted in a recordable type DVD.

In the encryption method about DVD, there is such a history that the CSS was firstly spread and then the CPRM was spread. Because of such a history or the like, some old type players cannot reproduce the data that is encrypted by the CPRM.

Hereinafter, the player that cannot reproduce the data encrypted by the CPRM is referred to as a "first-generation" player, and the player that can reproduce the data encrypted by the CPRM is referred to as a "second-generation" player.

Incidentally, most DVD players, specially the second-generation DVD players, have not only a reproduction function of reproducing the data recorded on the DVD but also a recording function of recording the data onto the DVD. The product name is also not a "DVD player" but a "DVD recorder". Here, however, for convenience of explanation, not only the apparatus having only the reproduction function but also the apparatus having both the reproduction function and the recording function are also referred to as the "player".

By the way, in case of a read-only disc on which the data encrypted by the CSS is recorded, both the first-generation player and the second-generation player can perform the reproduction.

However, in case of a recordable type disc on which the data encrypted by the CSS is recorded, the first-generation player can perform the reproduction, but the second-generation player cannot perform the reproduction.

That is, the encryption method adopted in the recordable type disc is not the CSS but the CPRM. Therefore, the second-generation player recognizes the recordable type disc on which the data encrypted by the CSS is recorded, as an abnormal disc. Then, the second-generation player ejects the recordable type disc on which the data encrypted by the CSS is recorded, without the reproduction.

The second-generation player recognizes the recordable type disc on which the data encrypted by the CSS is recorded, for example in the following procedure.

Firstly, the second-generation player judges whether or not a disc loaded on the player is the recordable type disc. Most second-generation players check whether or not there is a wobble formed on a groove which exists on the disc, to thereby judge whether or not to be the recordable type disc. Moreover, there is a possibility that some of the second-generation players check whether or not a LPP (Land pre pit) is formed on the disc, to thereby judge whether or not to be the recordable type disc.

When it is judged that the disc loaded on the player is the recordable type disc, then the second-generation player judges whether or not the data recorded on this disc is encrypted by the CSS. Then, if the data recorded on this disc is encrypted by the CSS, the second-generation player recognizes this disc as the abnormal disc.

DISCLOSURE OF INVENTION

Subject to be Solved by the Invention

If it can be achieved to encrypt the data by the CSS and record it onto the recordable type disc, or to distribute or sell the recordable type disc on which the data encrypted by the CSS is recorded, for example, it is possible to provide such merits.

Firstly, by encrypting the data by the CSS, the copyright protection can be achieved. Secondly, by using the recordable type disc, it is possible to significantly simplify an operation of recording the data, compared to the case where the data is stored onto the read-only type disc using a stampa. Thirdly, by using the CSS as the encryption method, it is possible to reproduce the data with the first-generation player which has been already wide-spread.

However, as described above, the second-generation player cannot perform the reproduction on the recordable type disc on which the data encrypted by the CSS is recorded.

In view of the aforementioned problems, it is therefore a first object of the present invention to provide a recordable type information recording medium, an information recording apparatus, an information recording method, and a computer program, which allow the copyright protection to be achieved, which can simplify the operation of recording the data, and which allow the data reproduction using such a player that has been already wide-spread.

It is a second object of the present invention to provide a recordable type information recording medium, an information recording apparatus, an information recording method, and a computer program, which allow the data encrypted by the CSS to be recorded and to be reproduced by the second-generation player.

Means for Solving the Subject

The above object of the present invention can be achieved by an information recording medium according to claim 1, provided with: a disc-shaped substrate; a recording layer which is formed on the substrate and which has a recording surface; a first concave portion which is formed in an inner circumferential area on the recording surface and which has a predetermined shape, in order to allow an information recording apparatus to recognize an information recording start position; a second concave portion which is formed in an outer circumferential area on the recording surface and which has a predetermined shape, in order to allow the information recording apparatus to recognize closeness of an information unrecordable position or arrival of the information unrecordable position; and a first groove which is formed in an intermediate area located between the inner circumferential area and the outer circumferential area on the recording surface and in which a wobble is not formed.

The above object of the present invention can be also achieved by an information recording medium according to claim 11, provided with: a disc-shaped substrate; a first recording layer which is formed on the substrate and which has a first recording surface; a second recording layer which is formed on the first recording layer through an intermediate layer and which has a second recording surface; a first concave portion which is formed in an inner circumferential area on the first recording surface and which has a predetermined shape, in order to allow an information recording apparatus to recognize an information recording start position on the first recording surface; a second concave portion which is formed in an outer circumferential area on the first recording surface and which has a predetermined shape, in order to allow the information recording apparatus to recognize closeness of an information unrecordable position or arrival of the information unrecordable position in the first recording layer; a first groove which is formed in an intermediate area located between the inner circumferential area and the outer circumferential area on the first recording surface and in which a wobble is not formed; a third concave portion which is formed in an outer circumferential area on the second recording surface and which has a predetermined shape, in order to allow the information recording apparatus to recognize an information recording start position on the second recording surface; a fourth concave portion which is formed in an inner circumferential area on the second recording surface and which has a predetermined shape, in order to allow the information recording apparatus to recognize closeness of an information unrecordable position or arrival of the information unrecordable position in the second recording layer; and a second groove which is formed in an intermediate area located between the outer circumferential area and the inner circumferential area on the second recording surface and in which a wobble is not formed.

The above object of the present invention can be also achieved by an information recording apparatus according to claim 12 for recording information onto a recording surface of the information recording medium according to claim 1, the information recording apparatus provided with: a recording start position determining device for reading the first concave portion from the information recording medium and determining the information recording start position on the basis of the read first concave portion; a recording device for recording the information from the information recording start position determined by the recording start position determining device, in accordance with guidance by the first groove of the information recording medium; and a nonrecordability judging device for reading the second concave portion from the information recording medium and judging whether or not it is close to the information unrecordable position or whether or not it arrives at the information unrecordable position, on the basis of the read second concave portion.

The above object of the present invention can be also achieved by an information recording method according to claim 14 of recording information onto a recording surface of the information recording medium according to claim 1, the information recording apparatus provided with: a recording start position determining process of reading the first concave portion from the information recording medium and determining the information recording start position on the basis of the read first concave portion; a recording process of recording the information from the information recording start position determined by the recording start position determining device, in accordance with guidance by the first groove of the information recording medium; and a nonrecordability judging process of reading the second concave portion from the information recording medium and judging whether or not it is close to the information unrecordable position or whether or not it arrives at the information unrecordable position, on the basis of the read second concave portion.

The above object of the present invention can be also achieved by a computer program according to claim 15 for making a computer perform the information recording method according to claim 14.

The above object of the present invention can be also achieved by a control structure according to claim 16 for controlling an information recording start position determining operation of an information recording apparatus, providing guidance about an information arrangement route in performing information recording by the information recording apparatus, and controlling an information recording ending operation of the information recording apparatus, the control structure provided with: a disc-shaped substrate; a recording layer which is formed on the substrate and which has a recording surface; a first concave portion which is formed in an inner circumferential area on the recording surface and which has a predetermined shape, in order to allow the information recording apparatus to recognize an information recording start position; a second concave portion which is formed in an outer circumferential area on the recording surface and which has a predetermined shape, in order to allow the information recording apparatus to recognize closeness of an information unrecordable position or arrival of the information unrecordable position; and a groove which is formed in an intermediate area located between the inner circumferential area and the outer circumferential area on the recording surface and in which a wobble is not formed.

BRIEF DESCRIPTION OF DRAWINGS

FIG. 1 is a perspective view showing a single-layer recording disc which is an embodiment of the information recording medium of the present invention, and a recorder which is an embodiment of the information recording apparatus of the present invention.

FIG. 2 is a perspective view showing the appearance of the recording disc in FIG. 1.

FIG. 3 is a cross sectional view showing the recording disc in FIG. 2.

FIG. 4 is a perspective view showing one portion (position A1 in FIG. 2) of the inner circumferential area of the recording disc in FIG. 2.

FIG. 5 is a perspective view showing one portion (position A2 in FIG. 2) of the outer circumferential area of the recording disc in FIG. 2.

FIG. 6 is a perspective view showing one portion (position A3 in FIG. 2) of the intermediate area of the recording disc in FIG. 2.

FIG. 7 is an explanatory diagram showing a correspondence relationship between the physical structure of the recording disc in FIG. 2 and a plurality of areas assigned on a recording surface on the basis of a function about data recording.

FIG. 8 is an explanatory diagram showing a modified example of the recording disc in FIG. 2.

FIG. 9 is a perspective view showing one portion of the inner circumferential area on which wobbling groups are formed.

FIG. 10 is an explanatory diagram showing another modified example of the recording disc in FIG. 2.

FIG. 11 is an explanatory diagram showing another modified example of the recording disc in FIG. 2.

FIG. 12 is a perspective view showing the appearance of a dual-layer recording disc, which is another embodiment of the information recording medium of the present invention.

FIG. 13 is a cross sectional view showing the recording disc in FIG. 12.

FIG. 14 is an explanatory diagram showing a correspondence relationship between the physical structure of the recording disc in FIG. 12 and a plurality of areas assigned on each recording surface on the basis of a function about data recording.

FIG. 15 is a block diagram showing the inner structure of the recorder in FIG. 1.

FIG. 16 is an explanatory diagram showing a specific example of the data recording performed on the single-layer recording disc by the recorder in FIG. 15.

FIG. 17 is an explanatory diagram showing another specific example of the data recording performed on the single-layer recording disc by the recorder in FIG. 15.

FIG. 18 is an explanatory diagram showing a specific example of the data recording performed on the dual-layer recording disc by the recorder in FIG. 15.

FIG. 19 is an explanatory diagram showing another specific example of the data recording performed on the dual-layer recording disc by the recorder in FIG. 15.

FIG. 20 is a flowchart showing a data recording process performed on the single-layer recording disc by the recorder in FIG. 15.

FIG. 21 is a flowchart showing a data recording process performed on the dual-layer recording disc by the recorder in FIG. 15.

DESCRIPTION OF REFERENCE CODES 1, 60 recording disc
2 recorder
11, 61 substrate
12, 62, 64 recording layer
12A, 62A, 64A recording surface
21, 71, 82 inner circumferential area
22, 72, 81 outer circumferential area
23, 73, 83 intermediate area
31, 34, 37, 74, 76, 78, 84, 86, 88 groove
33, 75, 85 positioning pit
36, 77, 87 overrun prevention pit
43, 93 lead-in area
201 optical pickup
202 displacing motor
203 spindle motor
206 actuator driving control circuit
207 position detection device
208 recording start position determination device
209 nonrecordability judgment device
211 total control device

BEST MODE FOR CARRYING OUT THE INVENTION

Hereinafter, the embodiments of the present invention will be explained with reference to the drawings.

(Single-Layer Recording Disc)

FIG. 1 shows a recording disc and a recorder.

A recording disc 1 in FIG. 1 is an embodiment of the information recording medium of the present invention. Moreover, the recording disc 1 is also an embodiment of the control structure of the present invention. On the other hand, a recorder 2 is an embodiment of the information recording apparatus of the present invention.

The recording disc 1 is a recordable type recording disc. The data can be recorded once onto the recording disc 1. The recording disc 1 has substantially the same structure as that of a single-layer DVD-R, except the structure about a groove and a LPP.

The recording disc 1 has the following functions.

Firstly, the recording disc 1 has such a function that the data can be easily recorded onto the recording disc 1. That is, the data can be easily recorded onto the optical disc 1, using a recorder, in substantially the same manner as the recording of the data onto the DVD-R. Unlike a DVD-ROM, it is unnecessary to store the data using a stamper.

Secondly, the recording disc 1 has such a function that the data which is encrypted by the CSS and which is recorded on the optical disc 1 can be reproduced by both the first-generation player and the second-generation player. That is, if the data encrypted by the CSS is recorded onto the DVD-R, the data recorded on the DVD-R cannot be reproduced by the second-generation player. However, if the data encrypted by the CSS is recorded onto the recording disc 1, the data recorded on the recording disc 1 can be reproduced by the second-generation player.

On the other hand, the recorder 2 is a recorder for recording the data onto the recording disc 1 and a recording disc 60 (refer to FIG. 12). The recording disc 1 and the recording disc 60 have a different structure about the groove and the LPP, from that of the DVD-R. Thus, the recorder 2 has a different part from that of a recorder for DVD-R, as described later. However, in the recorder 2, the wavelength of a light beam, the NA of an objective lens, the modulation method of the light beam for recording the data, or the like are the same as those of the recorder for DVD-R.

FIG. 2 shows the appearance of the recording disc 1. FIG. 3 shows the cross section of the recording disc 1. The cross section of the recording disc 1 in FIG. 3 is the cross section of one portion between E and F of the recording disc 1 in FIG. 2. Incidentally, in FIG. 2 and FIG. 3, the light beam of the recorder 2 is irradiated upward from the lower side of the recording disc 1.

As shown in FIG. 2, the recording disc 1 is disc-shaped in appearance and has a radius CH of 6 cm and a thickness of 1.2 mm.

As shown in FIG. 3, the recording disc 1 is provided with: a substrate 11; a recording layer 12; a reflective layer 13; and a protective layer 14. The substrate 11 is disc-shaped. The recording layer 12 formed on the substrate 11 is formed of an organic dye material and has a recording surface 12A. On the upper side of the recording layer 12, the reflective layer 13 and the protective layer 14 are laminated. The material, the thickness, and the lamination method or the like of the substrate 11, the recording layer 12, the reflective layer 13, and the protective layer 14 are substantially the same as those of the DVD-R.

As shown in FIG. 2, the recording layer 12 is formed from a position D to a position G in the direction of the radius CH of the recording disc 1. Then, the recording surface 12A is spread from the position D to the position G.

The recording surface 12A is divided into: an inner circumferential area 21; an outer circumferential area 22; and an intermediate area 23. That is, the inner circumferential area 21 is from the position D, which is an inner circumferential edge of the recording surface 12A (the recording layer 12), to a position E on the recording surface 12A. The distance between the position D and the position E is about 0.5 mm. Moreover, the outer circumferential area 22 is from a position F on the recording surface 12A and the position G, which is an outer circumferential edge of the recording surface 12A (the recording layer 12). The distance between the position F and the position G is about 0.5 mm. Moreover, the intermediate area 23 is between the inner circumferential area 21 and the outer circumferential area 22. The intermediate area 23 includes a point which is away from a center C of the recording disc 1 (the substrate 11) by ½ of the radius of the recording disc 1, on the recording surface 12A.

FIG. 4 indicates the recording surface 12A in one portion (position A1 in FIG. 2) of the inner circumferential area 21. Incidentally, in FIG. 4, the light beam of the recorder 2 is irradiated downward from the upper side of the recording disc 1. That is, FIG. 4 and FIG. 2 are upside down.

As shown in FIG. 4, in the inner circumferential area 21, a groove 31, a land 32, and a plurality of position determination pits 33 are formed on the recording surface 12A.

The groove 31 is formed spirally or concentrically on the basis of the center C of the recording disc 1 (the substrate 11). Moreover, the groove 31 does not have a wobble formed from the inner circumferential edge to the outer circumferential edge thereof. That is, the groove 31 is formed without meandering in the radial direction of the recording disc 1. Focusing on the not-meandering, the groove 31 is a so-called straight groove. The groove 31 is formed throughout the inner circumferential area 21.

The position determination pits 33 are formed on the land 32 between the grooves 31. The position determination pits 33 are arranged for example at regular intervals. The arrangement of the position determination pits 33 corresponds to the bit arrangement of the data which indicates an address on the recording surface 12A.

As the method of arranging the position determination pits 33, it is possible to use a method of arranging the LPP in the DVD-R. If the method of arranging the LPP in the DVD-R is used as the method of arranging the position determination pits 33, three position determination pits 33 make one set. Using the one set of position determination pits 33, one bit of the data, such as an address and other information, is expressed. In the inner circumferential area 21, it is desirable to arrange such a number of position determination pits 33 that constitute one or several ECC blocks. Incidentally, although the three position determination pits 33 make one set, there are not always the three position determination pits 33 in the one set of position determination pits 33. In accordance with address data to be expressed by the one set of position determination pits 33, either one or both of the second position determination pit 33 and the third position determination pit 33 of the three position determination pits 33 do not exist in some cases.

The arrangement of the position determination pits 33 may be formed throughout the inner circumferential area 21 or in one portion of the inner circumferential area 21. The arrangement of the position determination pits 33 is desirably formed at least in an outermost circumferential portion of the inner circumferential area 21, i.e. in a portion immediately before the intermediate area 23.

The groove 31 and the position determination pit 33 have a function of allowing the recorder 2 to recognize a data recording start position. Specifically, the groove 31 guides the light beam, irradiated in the inner circumferential area 21, onto the track. The position determination pits 33 allow the recorder 2 to recognize the address on the recording surface 12A. That is, the recorder 2 irradiates the light beam in accordance with the guidance of the groove 31 and reads the position determination pits 33, to thereby recognize the address on the recording surface 12A. Then, the recorder 2 determines the data recording start position on the basis of the address. The data recording start position is an inner circumferential edge position of the intermediate area 23, for example.

Moreover, by forming the arrangement of the position determination pits 33 in the position immediately before the intermediate area 23, it is possible to allow the recorder 2 to correctly recognize the data recording start position. That is, forming the arrangement of the position determination pits 33 immediately before the intermediate area 23 shortens the distance between the one set of position determination pits 33, disposed at the tail of the arrangement of the position determination pits 33, and the inner circumferential edge position of the intermediate area 23. By this, the recorder 2 can correctly recognize the inner circumferential edge position of the intermediate area 23, i.e. the data recording start position, on the basis of the one set of position determination pits 33, and the recorder 2 can correctly match a light beam irradiation start position for recording the data, with the data recording start position.

FIG. 5 shows the recording surface 12A in one portion (position A2 in FIG. 2) of the outer circumferential area 22. Incidentally, in FIG. 5, the light beam of the recorder 2 is irradiated downward from the upper side of the recording disc 1.

As shown in FIG. 5, in the outer circumferential area 22, a groove 34, a land 35, and overrun prevention pits 36 are formed on the recording surface 12A.

The groove 34 is formed spirally or concentrically on the basis of the center C of the recording disc 1 (the substrate 11). Moreover, the groove 34 does not have a wobble formed from the inner circumferential edge to the outer circumferential edge thereof. That is, the groove 34 is formed without meandering in the radial direction of the recording disc 1. Focusing on the not-meandering, the groove 34 is a so-called straight groove. The groove 34 is formed throughout the inner circumferential area 21.

The overrun prevention pits 36 are formed on the land 35 between the grooves 34. The overrun prevention pits 36 are arranged for example at regular intervals. The arrangement of the overrun prevention pits 36 corresponds to the bit arrangement of the data which indicates an address on the recording surface 12A.

As the method of arranging the overrun prevention pits 36, it is possible to use the method of arranging the LPP in the DVD-R. In the outer circumferential area 22, it is desirable to arrange such a number of overrun prevention pits 36 that constitute one or several ECC blocks.

The arrangement of the overrun prevention pits 36 may be formed throughout the outer circumferential area 22 or in one portion of the outer circumferential area 22. The arrangement of the overrun prevention pits 36 is desirably formed at least in an innermost circumferential portion of the outer circumferential area 22, i.e. in a portion immediately after the intermediate area 23.

The groove 34 and the overrun prevention pit 36 have a function of allowing the recorder 2 to recognize that it is close to a data unrecordable position. Specifically, the groove 34 guides the light beam, irradiated in the outer circumferential area 22, onto the track. The overrun prevention pits 36 allow the recorder 2 to recognize the address on the recording surface 12A. That is, the recorder 2 irradiates the light beam in accordance with the guidance of the groove 34 and reads the overrun prevention pits 36, to thereby recognize the address on the recording surface 12A. Then, the recorder 2 recognizes that it is close to the data unrecordable position on the basis of the address. The data unrecordable position is an outer circumferential position than the position G.

Moreover, by forming the arrangement of the overrun prevention pits 36 in the position immediately after the intermediate area 23, it is possible to allow the recorder 2 to promptly recognize the closeness of the data unrecordable position. By this, the recorder 2 can judge whether or not all the remaining data can be recorded into the remaining area of the recording surface 12A, in good time.

FIG. 6 shows the recording surface 12A in one portion (position A3 in FIG. 2) of the intermediate area 23. Incidentally, in FIG. 6, the light beam of the recorder 2 is irradiated downward from the upper side of the recording disc 1.

As shown in FIG. 6, in the intermediate area 23, a groove 37 and a land 38 are formed on the recording surface 12A.

The groove 37 is desirably formed spirally or concentrically on the basis of the center C of the recording disc 1 (the substrate 11). Moreover, the groove 37 does not have a wobble formed from the inner circumferential edge to the outer circumferential edge thereof. That is, the groove 37 is formed without meandering in the radial direction of the recording disc 1. Focusing on the not-meandering, the groove 37 is a so-called straight groove. The groove 37 is formed throughout the inner circumferential area 21. The land 38 is formed between the grooves 37.

The inner circumferential edge of the groove 37 is connected to the groove 31 in the inner circumferential area 21. The outer circumferential edge of the groove 37 is connected to the groove 34 in the outer circumferential area 22. The groove 31, the groove 37, and the groove 34 are continuously formed.

The groove 37 has a function of guiding the recorder 2 in a route to arrange the data when the recorder 2 performs the data recording. That is, the recorder 2 irradiates the light beam in accordance with the guidance of the groove 37 and records the data onto the groove 37.

Incidentally, the groove 31, the groove 37, and the groove 34 form the track on the recording surface 12A. Its track pitch is the same as that of the DVD-R, and it is 0.74 μm.

FIG. 7 shows a correspondence relationship between the physical structure of the recording disc 1 in FIG. 2 to FIG. 6 and a plurality of areas assigned on the recording surface 12A on the basis of the function about data recording.

As shown in FIG. 7, the plurality of areas are assigned to the recording surface 12A on the basis of the function about the data recording. That is, an IDTA (Inner Disc Testing Area) 41, a RMA (Recording Management Area) 42, a lead-in area 43, a data recording area 44, an initial lead-out area 45, and an ODTA (Outer Disc Testing Area) 46 are assigned to the recording surface 12A. The IDTA 41, the RMA 42, the lead-in area 43, the data recording area 44, the initial lead-out area 45, and the ODTA 46 are continuously arranged in this order, from the inner circumferential side to the outer circumferential side of the recording surface 12A.

The IDTA 41 is an area used to adjust the intensity of the light beam on the inner circumferential side of the recording disc 1. The lead-in area 43 is an area to record control information, management information about the data recorded in the data recording area 44, or the like. The data recording area 44 is an area to record video data, audio data, or the like. The initial lead-out area 45 is an area to record information which indicates the outer side of the data recording area 44. The ODTA 46 is an area used to adjust the intensity of the light beam on the outer circumferential side of the recording disc 1.

Incidentally, according to a data recording method of the recorder 2 described later, the lead-out area is displaced in accordance with the size of the data to be recorded on the recording disc 1. That is, if the size of the data to be recorded on the recording disc 1 is smaller than the total size of the size of the lead-in area 43 and the size of the data recording area 44, a new lead-out area is formed on the inner circumferential side than the initial lead-out area 45. On the other hand, if the size of the data to be recorded on the recording disc 1 is larger than the total size of the size of the lead-in area 43 and the size of the data recording area 44, a new lead-out area is formed on the outer circumferential side than the initial lead-out area 45.

The initial lead-out area 45 is a lead-out area provisionally or temporarily determined before the data is actually recorded into the lead-in area 43 and the data recording area 44 of the recording disc 1.

The ECC block address of each of the IDTA 41, the RMA 42, the lead-in area 43, the data recording area 44, the initial lead-out area 45, and the ODTA 46 is determined as follows in accordance with the standard of the single-layer DVD-R.

The head address of the IDTA 41: FFE17Fh (01E800h)
The head address of the lead-in area 43: FFDD05h (022FA0h)
The head address of the data recording area 44: FFCFFFh (030000h)
The head address of the initial lead-out area 45: FD9ED7h (261280h)
The tail address of the ODTA 46: FD9325h (26CDAFh)

Incidentally, the numerical value of the address is hexadecimal, and the numerical value in parenthesis is a physical sector number.

The inner circumferential area 21 corresponds to the IDTA 41 and the RMA 42. That is, the inner circumferential edge of the inner circumferential area 21 matches the head position of the IDTA 41, and the outer circumferential edge of the inner circumferential area 21 matches the tail position of the RMA 42. By this, the size of the inner circumferential area 21 is 47Ah if the ECC block address is used for calculation, and is 47A0h if the physical sector number is used for calculation.

Moreover, the groove 31 is disposed throughout the IDTA 41 and the RMA 42. Moreover, the arrangement of the position determination pits 33 is arrayed in either one or both of the IDTA 41 and the RMA 42. Moreover, the arrangement of the position determination pits 33 formed in the outermost portion of the inner circumferential area 21 is arrayed in a portion immediately before the lead-out area 43.

The outer circumferential area 22 corresponds to the initial lead-out area 45 and the ODTA 46. That is, the inner circumferential edge of the outer circumferential area 22 matches the head position of the initial lead-out area 45, and the outer circumferential edge of the outer circumferential area 22 matches the tail position of the ODTA 46. By this, the size of the outer circumferential area 22 is BB3h if the ECC block address is used for calculation, and is BB30h if the physical sector number is used for calculation.

Moreover, the groove 34 is disposed throughout the initial lead-out area 45 and the ODTA 46. Moreover, the arrangement of the overrun prevention pits 36 is arrayed in either one or both of the initial lead-out area 45 and the ODTA 46. Moreover, the arrangement of the overrun prevention pits 36 formed in the innermost portion of the outer circumferential area 22 is arrayed in a portion immediately after the data recording area 44.

The intermediate area 23 corresponds to the lead-in area 43 and the data recording area 44. That is, the inner circumferential edge of the intermediate area 23 matches the head position of the lead-in area 43, and the outer circumferential edge of the intermediate area 23 matches the tail position of the data recording area 44. Then, the data recording start position is the inner circumferential edge of the intermediate area 23, and this matches the head position of the lead-in area 43. Moreover, the groove 37 is disposed throughout the lead-in area 43 and the data recording area 44. That is, all the grooves formed in the lead-in area 43 and the data recording area 44 are straight grooves.

As explained above, the recording disc 1 is a recordable type disc having the recording layer 12 formed of an organic dye material. Therefore, it is possible to easily record the data onto the recording disc 1, using the recorder 2. That is, unlike a DVD-ROM, it is unnecessary to sue a stamper for the data recording. Moreover, since it is possible to easily record the data onto the recording disc 1 using the recorder 2, it is possible to reduce a cost for the operation of recording the data onto the recording disc 1 and to reduce an operation time. By this, it is possible to efficiently achieve low-volume production of content products in which particular content data is recorded on the recording disc 1.

Moreover, the recording disc 1 has the straight groups 37 formed from the head of the lead-in area 43 to the tail of the data recording area 44. By this, even if the data encrypted by the CSS is recorded onto the recording disc 1, the data recorded on the recording disc 1 can be reproduced not only by the first-generation player but also by the second-generation player.

That is, the second-generation player recognizes the recordable type disc on which the data encrypted by the CSS is recorded, as an abnormal disc, and ejects the recordable type disc on which such data is recorded without reproduction. Most second-generation players check whether or not there is a wobble formed on the groove which exists between the head of the lead-in area and the tail of the data recording area of the recording disc, to thereby judge whether or not to be the recordable type disc. Moreover, there is a possibility that some of the second-generation players check whether or not the LPP is formed from the head of the lead-in area and the tail of the data recording area of the recording disc, to thereby judge whether or not to be the recordable type disc.

However, in the groove 37 which exists between the head of the lead-in area 43 and the tail of the data recording area 44 of the recording disc 1, there is no wobble formed from the inner circumferential edge to the outer circumferential edge thereof. Moreover, there is no LPP between the head of the lead-in area 43 and the tail of the data recording area 44 of the recording disc 1. Thus, the second-generation player judges the recording disc 1 to be the read-only type disc (e.g. DVD-ROM). The read-only type disc on which the data encrypted by the CSS is recorded is not an abnormal disc. Therefore, the second-generation player judges the recording disc 1 to be a normal disc and allows the reproduction of the data recorded on the recording disc 1.

Therefore, it is possible to sell the content products in which the particular content data is recorded on the recording disc 1, not only for the users of the first-generation players but also for the users of the second-generation players, and to increase the sale of the content products. Moreover, it is possible to achieve the copyright protection since the content data recorded on the recording disc 1 is encrypted by the CSS.

Moreover, the position determination pits 33 are formed in the inner circumferential area 21 of the recording disc 1. The position determination pits 33 allow the recorder 2 to recognize the data recording start position.

That is, there is no wobble nor LPP formed in the lead-in area 43 and the data recording area 44 of the recording disc 1. Thus, the recorder 2 cannot obtain information about a recording position, such as address data, from the lead-in area 43 and the data recording area 44. Even in such a condition, the data recording process can be performed if a Disc At Once method is adopted as the data recording method of the recorder 2 and if the data recording start position can be determined on the recorder 2. The recorder 2 can determine the data recording start position by reading the position determination pits 33 formed in the inner circumferential area 21 of the recording disc 1, and thus can perform the process of recording the data onto the recording disc in the Disc At Once method.

Moreover, the overrun prevention pits 36 are formed in the outer circumferential area 22 of the recording disc 1. The overrun prevention pits 36 allow the recorder 2 to recognize the closeness of the data unrecordable position.

That is, there is no wobble nor LPP in the lead-in area 43 and the data recording area 44 of the recording disc 1. Thus, the recorder 2 cannot obtain the information about the recording position, such as address data, from the lead-in area 43 and the data recording area 44. Even in such a condition, the recorder 2 can recognize that it is close to the data unrecordable position by reading the overrun prevention pits 36. By this, it is possible to prevent the light beam of the recorder 2 from overrunning and to prevent the recorder 2 from performing the data recording process at the data unrecordable position.

(Modified Examples of Signal-Layer Recording Disc)

FIG. 8 shows another embodiment in which the straight groove 31 and the position determination pit 33 in the inner circumferential area 21 are replaced by a wobbling groove 51 and the straight groove 34 and the overrun prevention pit 36 in the outer circumferential area 22 are replaced by a wobbling groove 52.

As shown in FIG. 8, in the inner circumferential area 21, the wobbling groove 51 may be formed instead of forming the straight groove 31 and the position determination pit 33. The wobbling groove 51 is formed spirally or concentrically, on the basis of the center C of the recording disc 1 (substrate 11). The wobbling groove 51 is formed throughout the inner circumferential area 21.

In the wobbling groove 51, as shown in FIG. 9, a wobble 51A is formed. The wobble 51A has a predetermined amplitude in the radial direction of the recording disc 1 (substrate 11) and is formed in the circumferential direction (writing direction or reading direction) of the recording disc 1 along the groove 51. That is, the wobbling groove 51 meanders in the radial direction of the recording disc 1 (substrate 11). The wobble 51A is desirably formed from the inner circumferential edge to the outer circumferential edge of the wobbling groove 51.

The frequency, amplitude, or phase of the wobble 51A regularly changes, and the change in the frequency, amplitude, or phase of the wobble 51A corresponds to the bit arrangement of the data which indicates the address on the recording surface 12A. As a method of forming the wobble 51A, it is possible to use a method of forming a wobble on a DVD+R (Address In Pre-groove).

Even the wobbling grove 51 allows the recorder 2 to recognize the data recording start position.

Moreover, in the outer circumferential area 22, the wobbling grove 52 may be formed, instead of the straight groove 34 and the overrun prevention pits 36. The wobbling groove 52 is formed, spirally or concentrically, on the basis of the center C of the recording disc 1 (substrate 11). The wobbling groove 52 is formed throughout the outer circumferential area 22.

In the wobbling groove 52, a wobble 52A is formed. The wobble 52A has a predetermined amplitude in the radial direction of the recording disc 1 (substrate 11), and is formed in the circumferential direction (writing direction or reading direction) of the recording disc 1 along the groove 52. That is, the wobbling groove 53 meanders in the radial direction of the recording disc 1 (substrate 11). The wobble 52A is desirably formed from the inner circumferential edge to the outer circumferential edge of the wobbling groove 52.

The frequency, amplitude, or phase of the wobble 52A regularly changes, and the change in the frequency, amplitude, or phase of the wobble 52A corresponds to the bit arrangement of the data which indicates the address on the recording surface 12A. As a method of forming the wobble 52A, it is possible to use the method of forming a wobble on a DVD+R (Address In Pre-groove).

The wobbling groove 52 also allows the recorder 2 to recognize that it is close to the data unrecordable position.

FIG. 10 shows another embodiment in which only the straight groove 31 in the inner circumferential area 21 is replaced by a wobbling groove 55 and only the straight groove 34 in the outer circumferential area 22 is replaced by a wobbling groove 56.

As shown in FIG. 10, in the inner circumferential area 21, the wobbling groove 55 may be formed instead of forming the straight groove 31, and the position determination pits 33 may be formed on the land between the wobbling grooves 55. The position determination pits 33 are arranged to correspond to the bit arrangement of the data which indicates the address on the recording surface 12A. On the other hand, the cycle of a wobble 55A formed on the wobbling groove 55 is set constant.

The wobbling groove 55 and the position determination pit 33 also allow the recorder 2 to recognize the data recording start position. In particular, the wobble 55A which meanders in the constant cycle allows the recorder 2 to correctly read the position determination pits 33 and allows the recorder 2 to recognize the data recording start position, highly accurately.

Moreover, in the outer circumferential area 22, the wobbling groove 56 may be formed instead of forming the straight groove 34, and the overrun prevention pits 36 may be formed on the land between the wobbling grooves 56. The overrun prevention pits 36 are arranged to correspond to the bit arrangement of the data which indicates the address on the recording surface 12A. On the other hand, the cycle of a wobble 56A formed on the wobbling groove 56 is set constant.

The wobbling groove 56 and the position determination pit 33 also allow the recorder 2 to recognize the closeness of the data unrecordable position. In particular, the wobble 56A which meanders in the constant cycle allows the recorder 2 to correctly read the overrun prevention pits 36 and allows the recorder 2 to recognize the closeness of the data unrecordable position, highly accurately.

FIG. 11 shows another embodiment in which only the straight groove 34 and the overrun prevention pit 36 in the outer circumferential area 22 are replaced by the wobbling groove 52 having the wobble 52A. Even the structure shown in FIG. 11 allows the recorder 2 to recognize the data recording start position and allows the recorder 2 to recognize the closeness of the data unrecordable position.

(Dual-Layer Recording Disc)

FIG. 12 shows the appearance of a dual-layer recording disc. FIG. 13 shows the cross section of a recording disc 60 in FIG. 12. FIG. 14 shows a correspondence relationship between the physical structure of the recording disc 60 and a plurality of areas assigned on a recording surface 62A and a recording surface 64A on the basis of a function about data recording. The cross section of the recording disc 60 in FIG. 13 is a cross section of none portion between Q and R of the recording disc 60 in FIG. 12. Incidentally, in FIG. 12 and FIG. 13, the light beam of the recorder 2 is irradiated upward from the lower side of the recording disc 60.

The recording disc 60 is another embodiment of the information recording medium of the present invention. Moreover, the recording disc 60 is also another embodiment of the control structure of the present invention. The recording disc 60 has two recording layers. The recording disc 60 has substantially the same structure as that of a dual-layer DVD-R, except the structure about the groove and the LPP.

The recording disc 60, as in the recording disc 1 in FIG. 2, has a function which allows the data to be easily recorded onto the recording disc 60 and a function which allows both the first-generation player and the second-generation player to reproduce the data that is encrypted by the CSS and that is recorded on the recording disc 60.

As shown in FIG. 13, the recording disc 60 is provided with: a substrate 61; a first recording layer 62; a semi-transmissive layer 67; an intermediate layer 63; a second recording layer 64; a reflective layer 65; and a protective layer 66. The substrate 61 is disc-shaped. The first recording layer 62 formed on the substrate 61 is formed of an organic dye material and has a recording surface 62A. The second recording layer 64 formed on the first recording layer 62 through the semi-transmissive layer 67 and the intermediate layer 63 is formed of an organic dye material and has a recording surface 64A. On the upper side of the second recording layer 64, the reflective layer 65 and the protective layer 66 are laminated. The material, thickness, lamination method, and the like of the substrate 61, the first recording layer 62, the semi-transmissive layer 67, the intermediate layer 63, the second recording layer 64, the reflective layer 65 and the protective layer 66 are substantially the same as those of the dual-layer DVD-R.

As shown in FIG. 12, each of the recording layers 62 and 64 is formed from a position P to a position T in the direction of a radius OU of the recording disc 60. Then, each of the recording surfaces 62A and 64A is spread from the position P to the position T.

The recording surface 62A is divided into: an inner circumferential area 71; an outer circumferential area 72; and an intermediate area 73. That is, the inner circumferential area 71 is from the position P, which is an inner circumferential edge of the recording surface 62A (the recording layer 62), to a position Q on the recording surface 62A. The distance between the position P and the position Q is about 0.58 mm. Moreover, the outer circumferential area 72 is from a position R on the recording surface 62A and the position T, which is an outer circumferential edge of the recording surface 62A (the recording layer 62). The distance between the position R and the position T is about 0.4 mm. Moreover, the intermediate area 73 is between the inner circumferential area 71 and the outer circumferential area 72. The intermediate area 73 includes a point which is away from a center C of the recording disc 60 (the substrate 61) by ½ of the radius of the recording disc 60, on the recording surface 62A.

As shown in FIG. 14, in the inner circumferential area 71, a groove 74, a land, and a plurality of position determination pits 75 are formed on the recording surface 62A. The physical structures of the groove 74, the land, and the position determination pits 75 are substantially the same as those of the groove 31, the land 32, and the position determination pits 33 in FIG. 4. The arrangement of the position determination pits 75 corresponds to the bit arrangement of the data which indicates the address on the recording surface 62A.

Moreover, in the outer circumferential area 72, a groove 76, a land, and a plurality of overrun prevention pits 77 are formed on the recording surface 62A. The physical structures of the groove 72, the land, and the overrun prevention pits 77 are substantially the same as those of the groove 34, the land 35, and the overrun prevention pits 36 in FIG. 5. The arrangement of the overrun prevention pits 77 corresponds to the bit arrangement of the data which indicates the address on the recording surface 62A.

Moreover, in the intermediate area 73, a groove 78 and a land 79 (refer to FIG. 13) are formed on the recording surface 62A. The physical structures of the groove 78 and the land 79 are substantially the same as those of the groove 37 and the land 38 in FIG. 6.

On the other hand, as shown in FIG. 12, the recording surface 64A of the second recording layer 64 is divided into: an outer circumferential area 81; an inner circumferential area 82; and an intermediate area 83. That is, the outer circumferential area 81 is from the position T, which is an outer circumferential edge of the recording surface 64A (the recording layer 64), to a position S on the recording surface 64A. The distance between the position T and the position S is about 0.2 mm. Moreover, the inner circumferential area 82 is from the position Q on the recording surface 64A and the position P, which is an inner circumferential edge of the recording surface 64A (the recording layer 64). The distance between the position Q and the position P is about 0.58 mm. Moreover, the intermediate area 83 is between the inner circumferential area 81 and the outer circumferential area 82. The intermediate area 83 includes a point which is away from the center C of the recording disc 60 (the substrate 61) by ½ of the radius of the recording disc 60, on the recording surface 64A.

As shown in FIG. 14, in the outer circumferential area 81, a groove 74, a land, and a plurality of position determination pits 85 are formed on the recording surface 64A. The physical structures of the groove 81, the land, and the position determination pits 85 are substantially the same as those of the groove 31, the land 32, and the position determination pits 33 in FIG. 4. The arrangement of the position determination pits 85 corresponds to the bit arrangement of the data which indicates the address on the recording surface 62A.

Moreover, in the inner circumferential area 82, a groove 86, a land, and a plurality of overrun prevention pits 87 are formed on the recording surface 64A. The physical structures of the groove 86, the land, and the overrun prevention pits 87 are substantially the same as those of the groove 34, the land 35, and the overrun prevention pits 36 in FIG. 5. The arrangement of the overrun prevention pits 87 corresponds to the bit arrangement of the data which indicates the address on the recording surface 64A.

Moreover, in the intermediate area 83, a groove 88 and a land 89 (refer to FIG. 13) are formed on the recording surface 64A. The physical structures of the groove 88 and the land 89 are substantially the same as those of the groove 37 and the land 38 in FIG. 6.

As shown in FIG. 14, a plurality of areas are assigned to the recording surface 62A of the first recording layer 62 (L0: layer 0) on the basis of the function about the data recording. That is, an IDTA 91, a RMA 92, a lead-in area 93, a data recording area 94, an initial middle area 95, and an ODTA 96 are assigned to the recording surface 62A. The IDTA 91, the RMA 92, the lead-in area 93, the data recording area 94, the initial middle area 95, and the ODTA 96 are arranged continuously in this order from the inner circumferential side to the outer circumferential side of the recording surface 62A. The initial middle area 95 is a middle area provisionally or temporarily determined before the data is actually recorded into the lead-in area 93 and the data recording area 94.

The ECC block address of each of the IDTA 91, the RMA 92, the lead-in area 93, the data recording area 94, the initial middle area 95, and the ODTA 96 is determined as follows in accordance with the standard of the dual-layer DVD-R.

The head address of the IDTA 91: FFE077h (01F880h)

The head address of the lead-in area 93: FFDBBBh (024440h)

The head address of the data recording area 94: FFCFFFh (030000h)

The head address of the initial middle area 95: FDD109h (22EF60h)

The tail address of the ODTA 96: FDC887h (23778Fh)

Incidentally, the numerical value of the address is hexadecimal, and the numerical value in parenthesis is a physical sector number.

The inner circumferential area 71 corresponds to the IDTA 91 and the RMA 92. That is, the inner circumferential edge of the inner circumferential area 71 corresponds to the head position of the IDTA 91, and the outer circumferential edge of the inner circumferential area 71 corresponds to the tail position of the RMA 92. The size of the inner circumferential area 71 is 4BCh if the ECC block address is used for calculation, and is 4BC0h if the physical sector number is used for calculation.

Moreover, the groove 74 is disposed throughout the IDTA 91 and the RMA 92. Moreover, the arrangement of the position determination pits 75 is arrayed in either one or both of the IDTA 91 and the RMA 92. Moreover, the arrangement of the position determination pits 75 formed in the outermost portion of the inner circumferential area 71 is arrayed in a portion immediately before the lead-out area 93.

The outer circumferential area 72 corresponds to the initial middle area 95 and the ODTA 96. That is, the inner circumferential edge of the outer circumferential area 72 matches the head position of the initial middle area 95, and the outer circumferential edge of the outer circumferential area 72 matches the tail position of the ODTA 96. By this, the size of the outer circumferential area 72 is 883h if the ECC block address is used for calculation, and is 8830h if the physical sector number is used for calculation.

Moreover, the groove 76 is disposed throughout the initial middle area 95 and the ODTA 96. Moreover, the arrangement of the overrun prevention pits 77 is arrayed in either one or both of the initial middle area, 95 and the ODTA 96. Moreover, the arrangement of the overrun prevention pits 77 formed in the innermost portion of the outer circumferential area 72 is arrayed in a portion immediately after the data recording area 94.

The intermediate area 73 corresponds to the lead-in area 93 and the data recording area 94. That is, the inner circumferential edge of the intermediate area 73 matches the head position of the lead-in area 93, and the outer circumferential edge of the intermediate area 73 matches the tail position of the data recording area 94. Then, the data recording start position on the recording surface 62A of the first recording layer 62 is the inner circumferential edge of the intermediate area 73, and this matches the head position of the lead-in area 93. Moreover, the groove 78 is disposed throughout the lead-in area 93 and the data recording area 94. That is, all the grooves formed in the lead-in area 93 and the data recording area 94 are straight grooves.

On the other hand, an ODTA 101, an initial middle area 102, a data recording area 103, an initial lead-out area 104, a RMA 105, and an IDTA 106 are assigned to the recording surface 64A of the second recording layer 64 (L1: layer 1). The ODTA 101, the initial middle area 102, the data recording area 103, the initial lead-out area 104, the RMA 105, and the IDTA 106 are arranged continuously in this order from the outer circumferential side to the inner circumferential side of the recording surface 64A. The initial middle area 102 is a middle area provisionally or temporarily determined before the data is actually recorded into the data recording area 103. The initial lead-out area 104 is lead-out area provisionally or temporarily determined before the data is actually recorded into the data recording area 103.

The ECC block address of each of the ODTA 101, the initial middle area 102, the data recording area 103, the initial lead-out area 104, the RMA 105, and the IDTA 106 is determined as follows in accordance with the standard of the dual-layer DVD-R. Incidentally, the data is recorded onto the recording surface 62A of the first recording layer 62 from the inner circumferential side to the outer circumferential side of the recording disc 60, while the data is recorded onto the recording surface 64A of the second recording layer 64 from the outer circumferential side to the inner circumferential side of the recording disc 60. Considering this, it is assumed that the head of each area on the recording surface 64A of the second recording layer 64 is the outermost circumferential edge of the area and that the tail of each area on the recording surface 64A is the innermost circumferential edge of the area.

The head address of the ODTA 101: 0239B6h (DC6490h)

The head address of the initial middle area 102: 023573h (DCA8C0h)

The head address of the data recording area 103: 022EF5h (DD10A0h)

The head address of the RMA 105: 002680h (FD97F0h)

The tail address of the IDTA 96: 0021C6h (FDE39Fh)

Incidentally, the numerical value of the address is hexadecimal, and the numerical value in parenthesis is a physical sector number.

The outer circumferential area 81 corresponds to the ODTA 101. That is, the outer circumferential edge of the outer circumferential area 81 matches the head position of the ODTA 101, and the inner circumferential edge of the outer circumferential area 81 matches the tail position of the ODTA 101. The size of the outer circumferential area 81 is 443h if the ECC block address is used for calculation, and is 4430h if the physical sector number is used for calculation.

Moreover, the groove 84 is disposed throughout the ODTA 101. Moreover, the arrangement of the position determination pits 85 is arrayed in the ODTA 101. Moreover, the arrangement of the position determination pits 85 formed in the innermost portion of the outer circumferential area 81 is arrayed in a portion immediately before the initial middle area 102.

The inner circumferential area 82 corresponds to the RMA 105 and the IDTA 106. That is, the outer circumferential edge of the inner circumferential area 82 matches the head position of the RMA 105, and the inner circumferential edge of the inner circumferential area 82 matches the tail position of the IDTA 106. The size of the inner circumferential area 82 is 4BCh if the ECC block address is used for calculation, and is 4BC0h if the physical sector number is used for calculation.

Moreover, the groove 86 is disposed throughout the RMA 105 and the IDTA 106. Moreover, the arrangement of the overrun prevention pits 87 is arrayed in either one or both of the RMA 105 and the IDTA 106. Moreover, the arrangement of the overrun prevention pits 87 formed in the outermost portion of the inner circumferential area 82 is arrayed in a portion immediately after the data recording area 103.

The intermediate area 83 corresponds to the initial middle area 102, the data recording area 103, and the initial lead-out area 104. That is, the outer circumferential edge of the intermediate area 83 matches the head position of the initial middle area 102, and the inner circumferential edge of the intermediate area 83 matches the tail position of the initial lead-out area 104. Then, the data recording start position on the recording surface 64A of the second recording layer 64 is the outer circumferential edge of the intermediate area 83, and this matches the head position of the initial middle area 102. Moreover, the groove 88 is disposed throughout the initial middle area 102, the data recording area 103, and the initial lead-out area 104. That is, all the grooves formed in initial middle area 102, the data recording area 103, and the initial lead-out area 104 are straight grooves.

Incidentally, in order to equalize straight groove areas (areas without the wobble and the LPP) in the first recording layer 62 and the second recording layer 64, the position determination pits may be disposed in the initial middle area 102. In this case, the outer circumferential area 81 is an area including the ODTA 101 and the initial middle area 102 (i.e. an area from the head position of the ODTA 101 to the tail position of the initial middle area 102).

As explained above, according to the recording disc 60, it is possible to easily record the data onto the recording disc 60, using the recorder 2. Therefore, it is possible to efficiently achieve low-volume production of content products in which particular content data is recorded on the recording disc 60.

Moreover, according to the recording disc 60, even if the data encrypted by the CSS is recorded onto the recording disc 60, the data recorded on the recording disc 60 can be reproduced not only by the first-generation player but also by the second-generation player. Therefore, it is possible to sell the content products in which the particular content data is recorded on the recording disc 60, not only for the users of the first-generation players but also for the users of the second-generation players, and to increase the sale of the content products. Moreover, it is possible to achieve the copyright protection since the content data recorded on the recording disc 60 is encrypted by the CSS.

Moreover, in the inner circumferential area 71 and the outer circumferential area 81 of the recording disc 60, the position determination pits 75 and 85 are formed. The position determination pits 75 and 85 allow the recorder 2 to recognize the data recording start position. Therefore, the recorder 2 can perform the process of recording the data onto the recording disc 60 in the Disc At Once method.

Moreover, in the inner circumferential area 71 and the outer circumferential area 81 of the recording disc 60, the overrun prevention pits 77 and 87 are formed. The overrun prevention pits 77 and 87 allow the recorder 2 to recognize the closeness of the data unrecordable position. Therefore, it is possible to prevent the light beam of the recorder 2 from overrunning and to prevent the recorder 2 from performing the data recording process at the data unrecordable position.

Incidentally, the modified examples shown in FIG. 8 to FIG. 11 can be also applied to the recording disc 60.

(Recorder)

FIG. 15 shows the inner structure of the recorder 2 in FIG. 1.

The recorder 2 is a recorder for recording the data onto the recording disc 1 and the recording disc 60. The recorder 2 has the following several functions as follows.

Firstly, the recorder 2 has a function of reading the position determination pits 33 formed in the inner circumferential area 21 of the recording disc 1 and determining the data recording start position on the recording disc 1 on the basis of the position determination pits 33.

Secondly, the recorder 2 has a function of reading the overrun prevention pits 36 formed in the outer circumferential area 22 of the recording disc 1, recognizing the closeness of the data unrecordable position on the recording disc 1 on the basis of the overrun prevention pits 36, and preventing the overrun of the light beam.

Thirdly, the recorder 2 has a function of recording the data onto the groove 37 in accordance with the guidance of the straight groove 37 formed in the intermediate area 23 of the recording disc 1. The physical format about the data recording adopted by the recorder 2 is the same as that adopted by the DVD-R. Moreover, the data recording method adopted by the recorder 2 is the Disc At Once method.

Fourthly, the recorder 2 has a function of reading the position determination pits 75 and 85 formed in each of the inner circumferential area 71 and the outer circumferential area 81 of the recording disc 60, and determining the data recording start position in each of the recording surface 62A and the recording surface 64A of the recording disc 60 on the basis of the position determination pits 75 and 85.

Fifthly, the recorder 2 has a function of reading the overrun prevention pits 77 and 87 formed in each of the inner circumferential area 71 of the recording disc 60, recognizing the closeness of the data unrecordable position in each of the first recording layer 62 and the second recording layer 64 of the recording disc 60 on the basis of the overrun prevention pits 77 and 87, and preventing the overrun of the light beam.

Sixthly, the recorder 2 has a function of recording the data onto the groove 78 and 88 in accordance with the guidance of the straight grooves 78 and 88 formed in each of the intermediate areas 73 and 83 of the recording disc 60.

As shown in FIG. 15, the recorder 2 is provided with: an optical pickup 201; a displacing motor 202; a spindle motor 203; a light beam control circuit 204; a reading signal processing circuit 205; an actuator driving control circuit 206; a position detection device 207; a recording start position determination device 208; a nonrecordability judgment device 209; a data encoding circuit 210; and a total control device 211.

The optical pickup 201 irradiates the recording surface 12A of the recording disc 1 or the recording surfaces 62A and 64A of the recording disc 60 with the light beam, to thereby record the data onto the recording surfaces 12A, 62A and 64A. Moreover, the optical pickup 201 detects reflective light of the light beam returning from the recording surface 12A, 62A or 64A and generates a detection signal corresponding to the reflective light. The detection signal is supplied to the reading signal processing circuit 205.

The displacing motor 202 displaces the optical pickup 201 in the radial direction of the recording disc 1 or the recording disc 60.

The spindle motor 203 rotates the recording disc 1 or the recording disc 60.

The light beam control circuit 204 generates a light beam driving signal for modulating the light beam, on the basis of a data signal supplied from the data encoding circuit 210. The light beam driving signal is supplied to the optical pickup 201. By this, the optical pickup 201 irradiates the light beam modulated on the basis of the light beam driving signal.

The reading signal processing circuit 205 generates a reading signal and a tracking error signal on the basis of the detection signal outputted from the optical pickup 201. The reading signal includes a component corresponding to the address data expressed by the arrangement of the position determination pits 33, 75, and 85 or the arrangement of the overrun prevention pits 36, 77, and 87. The tracking error signal includes a component indicating the bias of the light beam with respect to the groove 37, 78, or 88. The reading signal is supplied to each of the recording start position determination device 208 and the nonrecordability judgment device 209, and the tracking error signal is supplied to the actuator driving control circuit 206.

The actuator driving control circuit 206 controls the driving of the displacing motor 202 and the spindle motor 203.

That is, the actuator driving control circuit 206 controls the driving of the displacing motor 202 on the basis of the tracking error signal. By this, the actuator driving control circuit 206 displaces the optical pickup 201 such that the light beam follows the groove 37, 78 or 88.

Moreover, the actuator driving control circuit 206 controls the driving of the spindle motor 203 on the basis of a rotational speed control signal supplied from the position detection device 207. The rotational speed control signal is a signal for changing the rotational speed of the recording disc 1 or 60 in accordance with the position of the optical pickup 201 in the radial direction of the recording disc 1 or 60. The actuator driving control circuit 206 changes the rotational speed of the spindle motor 203 on the basis of the rotational speed control signal, to thereby control the rotation of the recording disc 1 or 60 in a CLV (Constant Linear Velocity) method.

The position detection device 207 detects the position of the optical pickup 201 in the radial direction of the recording disc 1 or 60 and generates the rotational speed control signal on the basis of the detection result. The rotational speed control signal is supplied to the actuator driving control circuit 206.

The recording start position determination device 208 determines the data recording start position on the recording disc 1 or 60, on the basis of the reading signal supplied from the reading signal processing circuit 205. That is, the recording start position determination device 208 extracts, from the reading signal, the component corresponding to the address data expressed by the arrangement of the position determination pits 33, 75, or 85, recognizes the address on the recording surface 12A, 62A, or 64A on the basis of the component, and determines the data recording start position on the basis of the address.

The nonrecordability judgment device 209 judges whether or not it is close to the data unrecordable position on the recording disc 1 or 60, on the basis of the reading signal supplied from the reading signal processing circuit 205. That is, the nonrecordability judgment device 209 extracts, from the reading signal, the component corresponding to the address data expressed by the arrangement of the overrun prevention pits 36, 77, or 87, recognizes the address on the recording surface 12A, 62A, or 64A on the basis of the component, and judges whether or not it is close to the data unrecordable position on the basis of the address.

The data encoding circuit 210 receives, from the exterior, the data to be recorded onto the recording disc 1 or 60, encodes the data in the CSS encryption method, and supplies the light beam control circuit 204 with the encoded data as the data signal.

Incidentally, the data to be recorded onto the recording disc 1 includes in advance not only the data to be recorded into the data recording area 44 but also the data to be recorded into the lead-in area 43 and the data to be recorded into the lead-out area. Then, a data string in which the data to be recorded into the lead-in area 43, the data to be recorded into the data recording area 44, and the data to be recorded into the lead-out area are continuously arranged, is inputted to the data encoding circuit 210. Moreover, the same is true for the data to be recorded onto the recording disc 60, and a data string in which the data to be recorded into the lead-in area 93, the data to be recorded into the data recording area 94, the data to be recorded into the middle area of the first recording layer 61, the data to be recorded into the middle area of the second recording layer 64, the data to be recorded into the data recording area 103, and the data to be recorded into the lead-out area are continuously arranged, is inputted to the data encoding circuit 210.

The total control device 211 controls each of the constituent elements 201 to 210 of the recorder 2. That is, the total control device 211 controls each of the constituent elements

201 to 210 so as to record the data from the data recording start position determined by the recording start position determination device 208 in accordance with the guide by the groove 36, 78, or 88 of the recording disc 1 or 60.

The position detection device 207, the recording start position determination device 208, the nonrecordability judgment device 209, and the total control device 211 are formed of e.g. a CPU (Central Processing Unit), a ROM (Read-Only Memory), a RAM (Random-Access Memory), and the like.

FIG. 16 shows a specific example of the data recording performed on the recording disc 1 by the recorder 2.

As shown in FIG. 16, the recorder 2 firstly irradiates the inner circumferential area 21 of the recording disc 1 with the light beam, reads the position determination pits 33, and determines the data recording start position on the basis of the position determination pits 33.

Then, the recorder 2 starts the data recording from the data recording start position. The recorder 2 firstly records the data to be recorded into the lead-in area 43, then records the data to be recorded into the data recording area 44, and then records the data to be recorded into the lead-out area.

If the size of the data to be recorded onto the recording disc 1 is smaller than the sum of the size of the lead-in area 43 and the size of the data recording area 44, the data recording is ended in the middle of the data recording area 44. By this, a new lead-out area 47 is formed on the inner circumferential side of the initial lead-out area 45.

Moreover, if the size of the data to be recorded onto the recording disc 1 is smaller than the sum of the size of the lead-in area 43 and the size of the data recording area 44, the overrun prevention pits 36 are not read.

FIG. 17 shows another specific example of the data recording performed on the recording disc 1 by the recorder 2.

As shown in FIG. 17, the recorder 2 irradiates the inner circumferential area 21 of the recording disc 1 with the light beam, reads the position determination pits 33, and determines the data recording start position on the basis of the position determination pits 33.

Then, the recorder 2 starts the data recording from the data recording start position. The recorder 2 firstly records the data to be recorded into the lead-in area 43, then records the data to be recorded into the data recording area 44, and then records the data to be recorded into the lead-out area.

If the size of the data to be recorded onto the recording disc 1 is larger than the sum of the size of the lead-in area 43 and the size of the data recording area 44, the data recording is continued even after the data is recorded through the data recording area 44. Then, when the light beam enters the outer circumferential area 22, the overrun prevention pits 36 are read by the recorder 2.

The recorder 2 judges that it is close to the data unrecordable position on the basis of the overrun prevention pits 36. Then, the recorder 2 compares a size X of the remaining area of the recording surface 12A with the size of remaining data 48, and judges whether or not all the remaining data 48 can be recorded into the remaining area.

If all the remaining data 48 can be recorded into the remaining area, the recorder 2 records the remaining data 48 into the remaining area. Incidentally, in this case, a new lead-out area 49 is formed on the outer circumferential side of the initial lead-out area 45.

On the other hand, if all the remaining data 48 cannot be recorded into the remaining area, the recorder 2 stops the data recording.

FIG. 18 shows a specific example of the data recording performed on the recording disc 60 by the recorder 2.

As shown in FIG. 18, the recorder 2 irradiates the inner circumferential area 71 on the recording surface 62A of the first recording layer 62 with the light beam, reads the position determination pits 75, and determines the data recording start position on the recording surface 62A on the basis of the position determination pits 75.

Then, the recorder 2 starts the data recording on the recording surface 62A from the data recording start position. The recorder 2 firstly records the data to be recorded into the lead-in area 93, then records the data to be recorded into the data recording area 94, and then records the data to be recorded into the middle area on the recording surface 62A.

If the size of the data to be recorded onto the recording surface 62A is smaller than the sum of the size of the lead-in area 93 and the size of the data recording area 94, the data recording on the recording surface 62A is ended in the middle of the data recording area 94. By this, a new middle area 97 is formed on the inner circumferential side of the initial middle area 95.

Incidentally, if the size of the data to be recorded onto the recording surface 62A is smaller than the sum of the size of the lead-in area 93 and the size of the data recording area 94, the overrun prevention pits 77 are not read.

Then, the recorder 2 performs layer jump in that place, and changes the recording layer to record the data therein from the first recording layer 62 to the second recording layer 64. Then, the recorder 2 starts the data recording on the recording surface 64A, from a position substantially corresponding to the tail position of the middle area 97 of the first recording layer 62, on the recording surface 64A of the second recording layer 64. The recorder 2 firstly records the data to be recorded into the middle area on the recording surface 64A. By this, a new middle area 98 is formed on the inner circumferential side of the initial middle area 102. Then, the recorder 2 records the data to be recorded into the data recording area 103, and then records the data to be recorded into the lead-out area. By this, a new lead-out area 99 is formed on the recording surface 64A.

Incidentally, if the size of the data to be recorded onto the recording surface 64A is smaller than the size between the data recording start position on the recording surface 64A and the tail position of the initial lead-out area 104, the overrun prevention pits 87 are not read.

FIG. 19 shows another specific example of the data recording performed on the recording disc 60 by the recorder 2.

As shown in FIG. 19, the recorder 2 irradiates the inner circumferential area 71 on the recording surface 62A of the first recording layer 62 with the light beam, reads the position determination pits 75, and determines the data recording start position on the recording surface 62A on the basis of the position determination pits 75.

Then, the recorder 2 starts the data recording on the recording surface 62A from the data recording start position. The recorder 2 firstly records the data to be recorded into the lead-in area 93, then records the data to be recorded into the data recording area 94, and then records the data to be recorded into the middle area on the recording surface 62A.

If the size of the data to be recorded onto the recording surface 62A is larger than the sum of the size of the lead-in area 93 and the size of the data recording area 94, the data recording is continued even after the data is recorded through the data recording area 94. Then, when the light beam enters the outer circumferential area 72, the overrun prevention pits 77 are read by the recorder 2.

The recorder 2 judges that it is close to the data unrecordable position on the basis of the overrun prevention pits 77. Then, the recorder 2 compares a size Y of the remaining area of the recording surface 62A with the size of remaining data 107, and judges whether or not all the remaining data 107 can be recorded into the remaining area on the recording surface 62A.

If all the remaining data 107 can be recorded into the remaining area on the recording surface 62A, the recorder 2 records the remaining data 107 into the remaining area. By this, a new middle area 108 is formed on the outer circumferential side of the initial middle area 95.

Then, the recorder 2 changes the recording layer to record the data therein, from the first recording layer 62 to the second recording layer 64.

Then, the recorder 2 reads the position determination pit 85 formed in the outer circumferential area 81 on the recording surface 64A of the second recording layer 64, and determines the data recording start position on the recording surface 64A on the basis of the position determination pits 85.

Then, the recorder 2 starts the data recording on the recording surface 64A from the data recording start position. The recorder 2 firstly records the data to be recorded into the middle area on the recording surface 64A, into the initial middle area 102. Then the recorder 2 records the data to be recorded into the data recording area 103, and then records the data to be recorded into the lead-out area.

If the size of the data to be recorded onto the recording surface 64A is larger than the sum of the size of the initial middle area 102, the size of the data recording area 103, and the size of the initial lead-out area 104, the data recording is continued even after the data is recorded throughout the areas 102, 103, and 104. Then, when the light beam enters the inner circumferential area 82, the overrun prevention pits 87 are read by the recorder 2.

The recorder 2 judges that it is close to the data unrecordable position, on the basis of the overrun prevention pits 87. Then, the recorder 2 compares a size Z of the remaining area of the recording surface 64A with the size of remaining data 109, and judges whether or not all the remaining data 109 can be recorded into the remaining area of the recording surface 64A.

If all the remaining data 109 can be recorded into the remaining area on the recording surface 64A, the recorder 2 records the remaining data 109 into the remaining area. By this, a new lead-out area 110 is formed on the outer circumferential side of the initial lead-out area 104.

On the other hand, if all the remaining data 109 cannot be recorded into the remaining area on the recording surface 64A, the recorder 2 stops the data recording. Moreover, the recorder 2 also stops the data recording if all the remaining data 107 cannot be recorded into the remaining area on the recording surface 62A when the data is recorded onto the recording surface 62A of the first recording layer 62.

FIG. 20 shows a flow of the data recording process performed on the recording disc 1 by the recorder 2.

When a creator of a content product loads the recording disc 1 onto the recorder 2, inputs the data to be recorded onto the recording disc 1, to the recorder 2, operates the operation switch of the recorder 2, and inputs an instruction to start the recording of the data onto the recording disc 1, to the recorder 2, the data recording process shown in FIG. 20 is started.

Firstly, the total control device 211 of the recorder 2 sets the power of the light beam (step S1). Specifically, the total control device 211 sequentially irradiates the IDTA 41 and the ODTA 46 with the light beam and sets the power of the light beam optimum for the data recording.

Then, the total control device 211 irradiates the inner circumferential area 21 of the recording disc 1 with the light beam, searches the inner circumferential area 21, and reads the position determination pits 33. Then, the recording start position determination device 208 determines the data recording start position on the basis of the position determination pits 33 (step S2).

Then, the total control device 211 starts the data recording from the data recording start position (steps S3 and S4).

Then, the total control device 211 judges whether or not all the data is recorded on the recording disc 1 (step S5). If all the data is recorded on the recording disc 1 (the step S5: YES), the total control device 211 ends the data recording process.

On the other hand, if all the data is not recorded on the recording disc 1 (the step S5: NO), then the nonrecordability judgment device 209 judges whether or not it is close to the data unrecordable position (step S6). That is, the nonrecordability judgment device 209 judges whether or not the overrun prevention pits 36 formed in the outer circumferential area 22 of the recording disc 1 are read, to thereby judge whether or not it is close to the data unrecordable position.

If the overrun prevention pits 36 are not read and thus it is judged that it is not close to the data unrecordable position yet (the step S6: NO), the total control device 211 continues the data recording (the step S4).

On the other hand, if the overrun prevention pits 36 are read and thus it is judged that it is close to the data unrecordable position (the step S6: YES), the total control device 211 compares the size of the remaining area on the recording surface 12A with the size of the remaining data (step S7). Then, the total control device 211 judges whether or not all the remaining data can be recorded into the remaining area on the recording surface 12A (step S8).

If all the remaining data can be recorded into the remaining area on the recording surface 12A (the step S8: YES), the total control device 211 continues the recording until the recording of the remaining data is completed (the step S4). Then, after the recording of the remaining data is completed, the data recording process is ended.

On the other hand, if all the remaining data cannot be recorded into the remaining area on the recording surface 12A (the step S8: NO), the total control device 211 performs a recording stop process (step S9). By this, the data recording process performed on the recording disc 1 is stopped.

FIG. 21 shows a flow of the data recording process performed on the recording disc 60 by the recorder 2.

When a creator of a content product loads the recording disc 60 onto the recorder 2, inputs the data to be recorded onto the recording disc 60, to the recorder 2, operates the operation switch of the recorder 2, and inputs an instruction to start the recording of the data onto the recording disc 60, to the recorder 2, the data recording process shown in FIG. 21 is started.

Firstly the total control device 211 of the recorder 2 sets the power of the light beam (step S11).

Then, the total control device 211 irradiates the inner circumferential area 71 on the recording surface 62A of the first recording layer 62 with the light beam, searches the inner circumferential area 71, and reads the position determination pits 75. Then, the recording start position determination device 208 determines the data recording start position on the recording surface 62A on the basis of the position determination pits 75 (step S12).

Then, the total control device 211 starts the data recording from the data recording start position (steps S13 and S14).

Then, the total control device 211 judges whether or not all the data to be recorded onto the recording surface 62A is recorded on the recording surface 62A (step S15).

If all the data to be recorded onto the recording surface 62A is not recorded on the recording surface 62A (the step S15:

NO), then the nonrecordability judgment device 209 judges whether or not it is close to the data unrecordable position (step S16). That is, the nonrecordability judgment device 209 judges whether or not the overrun prevention pits 77 formed in the outer circumferential area 72 on the recording surface 62A are read, to thereby judge whether or not it is close to the data unrecordable position.

If the overrun prevention pits 77 are not read and thus it is judged that it is not close to the data unrecordable position yet (the step S16: NO), the total control device 211 continues the data recording on the recording surface 62A (the step S14).

On the other hand, if the overrun prevention pits 77 are read and thus it is judged that it is close to the data unrecordable position (the step S16: YES), the total control device 211 compares the size of the remaining area on the recording surface 62A with the size of the remaining data to be recorded onto the recording surface 62A (step S17). Then, the total control device 211 judges whether or not all the remaining data to be recorded onto the recording surface 62A can be recorded into the remaining area on the recording surface 62A (step S18).

If all the remaining data to be recorded onto the recording surface 62A cannot be recorded into the remaining area on the recording surface 62A (the step S18: NO), the total control device 211 performs the recording stop process (step S19). By this, the data recording process performed on the recording disc 60 is stopped.

On the other hand, if all the remaining data to be recorded onto the recording surface 62A can be recorded into the remaining area on the recording surface 62A (the step S18: YES), the total control device 211 continues the recording until the recording of the remaining data is continued (the step S14). Then, when all the data to be recorded onto the recording surface 62A is recorded on the recording surface 62A (the step S15: YES), the total control device 211 performs layer jump and changes the recording layer to record the data therein, from the first recording layer 62 to the second recording layer 64 (step S20). Then, the total control device 211 starts the data recording onto the recording surface 64A of the second recording layer 64 (steps S21 and S22).

Then, the total control device 211 judges whether or not all the data to be recorded onto the recording surface 64A is recorded on the recording surface 64A (step S23).

If all the data to be recorded onto the recording surface 64A is not recorded on the recording surface 64A (the step S23: NO), then, the nonrecordability judgment device 209 judges whether or not it is close to the data unrecordable position (step S24). That is, the nonrecordability judgment device 209 judges whether or not the overrun prevention pits 87 formed in the inner circumferential area 82 on the recording surface 64A are read, to thereby judge whether or not it is close to the data unrecordable position.

If the overrun prevention pits 87 are not read and thus it is judged that it is not close to the data unrecordable position yet (the step S24: NO), the total control device 211 continues the data recording on the recording surface 64A (step S22).

On the other hand, if the overrun prevention pits 87 are read and thus it is judged that it is close to the data unrecordable position yet (the step S24: YES), the total control device 211 compares the size of the remaining area on the recording surface 64A with the size of the remaining data to be recorded onto the recording surface 64A (step S25). Then, the total control device 211 judges whether or not all the remaining data to be recorded onto the recording surface 64A can be recorded into the remaining area on the recording surface 64A (step S26).

If all the remaining data to be recorded onto the recording surface 64A cannot be recorded into the remaining area on the recording surface 64A (the step S26: NO), the total control device 211 performs the recording stop process (step S27). By this, the data recording process performed on the recording disc 60 is stopped.

On the other hand, if all the remaining data to be recorded onto the recording surface 64A can be recorded into the remaining area on the recording surface 64A (the step S26: YES), the total control device 211 continues the recording until the recording of the remaining data is completed (step S22). Then, when all the data to be recorded onto the recording surface 64A is recorded on the recording surface 64A (the step S23: YES), the total control device 211 ends the data recording process on the recording disc 60.

As explained above, according to the recorder 2, it is possible to record the data onto the recording disc 1 or the recording disc 60. That is, it is possible to perform the data recording process on the basis of the position determination pits 33 and the overrun prevention pits 36 of the recording disc 1, to thereby record the data onto the straight groove 37 of the recording disc 1. Moreover, by performing the data recording process on the basis of the position determination pits 75 and 85 and the overrun prevention pits 77 and 87 of the recording disc 60, it is possible to record the data onto the straight grooves 78 and 88.

Moreover, according to the recorder 2, it is possible to easily record the data onto the recording disc 1 or the recording disc 60. By this, it is possible to efficiently achieve low volume production of content products in which particular content data is recorded on the recording disc 1 or the recording disc 60.

Incidentally, the arrangement of the overrun prevention pits 36 of the recording disc 1 described above corresponds to the bit arrangement of the data which indicates the address on the recording surface 12A. The present invention, however, is not limited to this. The overrun prevention pits 36 do not have to correspond to the bit arrangement of the data which indicates the address on the recording surface 12A. For example, the overrun prevention pit 36 may be a single pit. Even the single pit allows the recorder 2 to recognize the closeness of the data unrecordable position. Nevertheless, by making the arrangement of the overrun prevention pits 36 correspond to the address data bit arrangement, it is possible not only to make the recorder 2 simply recognize the closeness of the data unrecordable position but also to make the recorder 2 recognize the address on the recording surface 12A in the vicinity of the data unrecordable position. Moreover, the recorder 2 can easily calculate the size of the remaining area on the recording surface 12A on the basis of the address. The same is true for the overrun prevention pits 77 and 87 of the recording disc 60.

Moreover, the change in the cycle of the wobble 52A in FIG. 8 or FIG. 11 corresponds to the bit arrangement of the data which indicates the address on the recording surface 12A. However, the cycle of the wobble 52A may be set constant.

Moreover, the overrun prevention pits 36 of the recording disc 1 described above allow the recorder 2 to recognize the closeness of the data unrecordable position. The present invention, however, is not limited to this. The overrun prevention pits may allow the recorder 2 to recognize the reaching the data unrecordable position. In this case, the overrun prevention pits are disposed immediately before the data unrecordable position. The same is true for the overrun prevention pits 77 and 87 of the recording disc 60.

Moreover, the recording disc 1 and the recording disc 60 described above have substantially the same structure as that of the DVD-R, except the structures of the groove and the LPP. The present invention, however, is not limited to this. The recording disc of the present invention can adopt substantially the same structure as that of a DVD-RW, except the structures of the groove and the LPP. In this case, the recording layer is formed of a phase change material.

Moreover, in the recording disc 1, the distance between the inner circumferential edge of the intermediate area 23 and the inner circumferential edge of the recording layer 12 may be adjusted in range of 0.4 mm or more but not exceeding 0.7 mm. Moreover, the distance between the outer circumferential edge of the intermediate area 23 and the outer circumferential edge of the recording layer 12 may be adjusted in range of 0.3 mm or more but not exceeding 0.6 mm.

Moreover, in the recording disc 60, the distance between the inner circumferential edge of the intermediate area 73 and the inner circumferential edge of the first recording layer 62 may be adjusted in range of 0.4 mm or more but not exceeding 0.7 mm. Moreover, the distance between the outer circumferential edge of the intermediate area 73 and the outer circumferential edge of the first recording layer 62 may be adjusted in range of 0.3 mm or more but not exceeding 0.6 mm.

Moreover, in the recording disc 60, the distance between the inner circumferential edge of the intermediate area 83 and the inner circumferential edge of the second recording layer 64 may be adjusted in range of 0.4 mm or more but not exceeding 0.7 mm. Moreover, the distance between the outer circumferential edge of the intermediate area 83 and the outer circumferential edge of the second recording layer 64 may be adjusted in range of 0.3 mm or more but not exceeding 0.6 mm.

Moreover, the groove 31 and the position determination pits 33 in FIG. 7 are a specific example of the first concave portion, and the groove 34 and the overrun prevention pits 36 are a specific example of the second concave portion.

Moreover, the groove 74 and the position determination pits 75 in FIG. 14 are a specific example of the first concave portion, and the groove 76 and the overrun prevention pits 77 are a specific example of the second concave portion. The groove 84 and the position determination pits 85 are a specific example of the third concave portion, and the groove 86 and the overrun prevention pits 87 are a specific example of the fourth concave portion.

Moreover, the optical pickup 201, the displacing motor 202, the spindle motor 203, the position detection device 207, the actuator driving control circuit 206, and the total control device 211 in FIG. 15 are a specific example of the recording device. The recording start position determination device 208 is a specific example of the recording start position determining device. The nonrecordability judgment device 209 is a specific example of the nonrecordability judging device. The displacing motor 202 is a specific example of a displacement mechanism. The spindle motor 203 is a specific example of the rotation mechanism. The position detection device 207 is a specific example of the position detecting device. The actuator driving control circuit 206 is a specific example of the rotational speed controlling device.

Moreover, the step S2 in FIG. 20 is a specific example of the recording start position determining process. The step S3 and the step S4 are a specific example of the recording process. The step S6 is a specific example of the nonrecordability judging process.

Moreover, the step S12 in FIG. 21 is a specific example of the recording start position determining process. The step S13 and the step S14 are a specific example of the recording process. The step S16 is a specific example of the nonrecordability judging process. Moreover, the step S21 and the step S22 are a specific example of the recording process. The step S24 is a specific example of the nonrecordability judging process.

Moreover, the data recording start position determination by the recording start position determination device 208 of the recorder 2 (the step S2 in FIG. 2 and the step S12 in FIG. 21) is a specific example of the information recording start position determining operation. The recording stop process by the nonrecordability judgment device 209 and the total control device 211 (the step S6 to the step S9 in FIG. 20, the step S16 to the step S19 in FIG. 21, or the step S24 to the step S28) is a specific example of the information recording ending operation.

Moreover, the information recording method of the present invention can be also realized by a computer program. In this case, such a computer program is prepared that describes an instruction or command to realize each step in the data recording process shown in FIG. 20 or the data recording process shown in FIG. 21. Then, the computer program is recorded onto the information recording medium and is sold as a computer program product. Moreover, the computer program can be downloaded through a computer network, such as the Internet. A user obtains the computer program through the information recording medium or the computer network and makes a computer read the computer program. By this, the computer uses resources normally provided for the computer, such as a CPU, a main memory apparatus, and a DVD drive apparatus, to thereby perform the data recording process shown in FIG. 20 or FIG. 21.

Moreover, the information recording method of the present invention can be also realized by a computer program. In this case, such a computer program is prepared that describes an instruction or command to realize each step in the data recording process shown in FIG. 20 or the data recording process shown in FIG. 21. Then, the computer program is recorded onto the information recording medium and is sold as a computer program product. Moreover, the computer program can be downloaded through a computer network, such as the Internet. A user obtains the computer program through the information recording medium or the computer network and makes a computer read the computer program. By this, the computer uses resources normally provided for the computer, such as a CPU, a main memory apparatus, and a DVD drive apparatus, to thereby perform the data recording process shown in FIG. 20 or FIG. 21.

The present invention is not limited to the aforementioned embodiment, but various changes may be made, if desired, without departing from the essence or spirit of the invention which can be read from the claims and the entire specification. An information recording medium, an information recording apparatus, an information recording method, and a computer program, all of which involve such changes, are also intended to be within the technical scope of the present invention.

INDUSTRIAL APPLICABILITY

The present invention can be applied to the manufacturing, provision, and use of products, such as a DVD and a DVD recorder.

The invention claimed is:

1. An information recording medium comprising:
a disc-shaped substrate;
a recording layer which is formed on said substrate and which has a recording surface;

a first concave portion which is formed in an inner circumferential area on the recording surface and which has a predetermined shape, in order to allow an information recording apparatus to recognize an information recording start position;

a second concave portion which is formed in an outer circumferential area on the recording surface and which has a predetermined shape, in order to allow said information recording apparatus to recognize closeness of an information unrecordable position or arrival of the information unrecordable position; and a first groove which is formed in an intermediate area located between the inner circumferential area and the outer circumferential area on the recording surface and in which a wobble is not formed.

2. The information recording medium according to claim 1, wherein said first concave portion comprises:

a second groove which is formed spirally or concentrically on the basis of a center of said substrate and in which a wobble is not formed; and a plurality of pits located between one portion of the second groove and other portion of the second groove.

3. The information recording medium according to claim 2, wherein arrangement of the plurality of pits corresponds to bit arrangement of data which indicates an address on the recording surface.

4. The information recording medium according to claim 1, wherein said first concave portion comprises a second groove which is formed spirally or concentrically on the basis of a center of said substrate, and a wobble is formed in the second groove.

5. The information recording medium according to claim 4, wherein a frequency, an amplitude, or a phase of the wobble changes in accordance with bit arrangement of data which indicates an address on the recording surface.

6. The information recording medium according to claim 1, wherein said second concave portion comprises:

a third groove which is formed spirally or concentrically on the basis of a center of said substrate and in which a wobble is not formed; and a plurality of pits located between one portion of the third groove and other portion of the third groove.

7. The information recording medium according to claim 1, wherein said second concave portion comprises a third groove which is formed spirally or concentrically on the basis of a center of said substrate, and a wobble is formed in the third groove.

8. The information recording medium according to claim 1, wherein said intermediate area includes a point which is away from a center of said substrate by ½ of a radius of said substrate.

9. The information recording medium according to claim 1, wherein a distance between an inner circumferential edge of said intermediate area and an inner circumferential edge of said recording layer is 0.4 mm or more but not exceeding 0.7 mm, and a distance between an outer circumferential edge of said intermediate area and an outer circumferential edge of said recording layer is 0.3 mm or more but not exceeding 0.6 mm.

10. The information recording medium according to claim 1, wherein an inner circumferential edge of said intermediate area matches a head of a lead-in area.

11. An information recording medium comprising:

a disc-shaped substrate;

a first recording layer which is formed on said substrate and which has a first recording surface;

a second recording layer which is formed on said first recording layer through an intermediate layer and which has a second recording surface;

a first concave portion which is formed in an inner circumferential area on the first recording surface and which has a predetermined shape, in order to allow an information recording apparatus to recognize an information recording start position on the first recording surface;

a second concave portion which is formed in an outer circumferential area on the first recording surface and which has a predetermined shape, in order to allow said information recording apparatus to recognize closeness of an information unrecordable position or arrival of the information unrecordable position in said first recording layer;

a first groove which is formed in an intermediate area located between the inner circumferential area and the outer circumferential area on the first recording surface and in which a wobble is not formed;

a third concave portion which is formed in an outer circumferential area on the second recording surface and which has a predetermined shape, in order to allow said information recording apparatus to recognize an information recording start position on the second recording surface;

a fourth concave portion which is formed in an inner circumferential area on the second recording surface and which has a predetermined shape, in order to allow said information recording apparatus to recognize closeness of an information unrecordable position or arrival of the information unrecordable position in said second recording layer; and a second groove which is formed in an intermediate area located between the outer circumferential area and the inner circumferential area on the second recording surface and in which a wobble is not formed.

12. An information recording apparatus for recording information onto a recording surface of the information recording medium according to claim 1, said information recording apparatus comprising:

a recording start position determining device for reading said first concave portion from said information recording medium and determining the information recording start position on the basis of said read first concave portion;

a recording device for recording the information from the information recording start position determined by said recording start position determining device, in accordance with guidance by said first groove of said information recording medium; and a nonrecordability judging device for reading said second concave portion from said information recording medium and judging whether or not it is close to the information unrecordable position or whether or not it arrives at the information unrecordable position, on the basis of said read second concave portion.

13. The information recording apparatus according to claim 12, wherein said recording device comprises:

an optical pickup for irradiating the recording surface with a light beam;

a displacement mechanism for displacing the optical pickup in a radial direction of said information recording medium;

a rotation mechanism for rotating said information recording medium;

a position detecting device for detecting a position of the optical pickup in the radial direction of said information recording medium; and a rotational speed controlling device for controlling the rotation mechanism and changing a rotational speed of said information recording medium on the basis of the position of the optical pickup detected by the position detecting device.

14. An information recording method of recording information onto a recording surface of the information recording medium according to claim 1, said information recording apparatus comprising:

a recording start position determining process of reading said first concave portion from said information recording medium and determining the information recording start position on the basis of said read first concave portion;

a recording process of recording the information from the information recording start position determined by said recording start position determining device, in accordance with guidance by said first groove of said information recording medium; and a nonrecordability judging process of reading said second concave portion from said information recording medium and judging whether or not it is close to the information unrecordable position or whether or not it arrives at the information unrecordable position, on the basis of said read second concave portion.

15. A computer program product in a computer-readable medium for tangibly embodying a program of instructions executable by a computer provided for the information recording apparatus, said computer program product making the computer perform the information recording method according to claim 14.

16. A control structure for controlling an information recording start position determining operation of an information recording apparatus, providing guidance about an information arrangement route in performing information recording by said information recording apparatus, and controlling an information recording ending operation of said information recording apparatus, said control structure comprising:

a disc-shaped substrate;

a recording layer which is formed on said substrate and which has a recording surface;

a first concave portion which is formed in an inner circumferential area on the recording surface and which has a predetermined shape, in order to allow said information recording apparatus to recognize an information recording start position;

a second concave portion which is formed in an outer circumferential area on the recording surface and which has a predetermined shape, in order to allow said information recording apparatus to recognize closeness of an information unrecordable position or arrival of the information unrecordable position; and a first groove which is formed in an intermediate area located between the inner circumferential area and the outer circumferential area on the recording surface and in which a wobble is not formed.

* * * * *